United States Patent [19]
Sasaki et al.

[11] Patent Number: 6,131,388
[45] Date of Patent: *Oct. 17, 2000

[54] COMPRESSION IGNITION TYPE ENGINE

[75] Inventors: Shizuo Sasaki, Numazu; Satoshi Iguchi, Mishima; Takekazu Ito; Tsukasa Abe, both of Susono, all of Japan

[73] Assignee: Toyota Jidosha Kabushiki Kaisha, Toyota, Japan

[ * ] Notice: This patent is subject to a terminal disclaimer.

[21] Appl. No.: 09/173,550

[22] Filed: Oct. 16, 1998

[30] Foreign Application Priority Data

Nov. 25, 1997 [JP] Japan ................................ 9-323086

[51] Int. Cl.⁷ ....................................................... F01N 3/00
[52] U.S. Cl. .............................. 60/286; 60/278; 60/285; 60/276
[58] Field of Search ............................ 60/278, 276, 285, 60/286, 295, 297, 301, 303; 123/435, 568.21, 568.26

[56] References Cited

U.S. PATENT DOCUMENTS

| | | |
|---|---|---|
| 4,142,493 | 3/1979 | Schira et al. . |
| 4,454,854 | 6/1984 | Gotoh et al. . |
| 5,172,550 | 12/1992 | Takeshima . |
| 5,482,020 | 1/1996 | Shimizu et al. . |
| 5,632,144 | 5/1997 | Isobe . |
| 5,732,554 | 3/1998 | Sasaki et al. . |
| 5,890,360 | 4/1999 | Sasaki et al. ............................ 60/278 |
| 5,937,639 | 8/1999 | Sasaki et al. ............................ 60/278 |

FOREIGN PATENT DOCUMENTS

| | | |
|---|---|---|
| 4-334750 | 11/1992 | Japan . |
| 6-346763 | 12/1994 | Japan . |
| 7-4287 | 1/1995 | Japan . |

OTHER PUBLICATIONS

Y. Sato et al., "A Simultaneous Reduction of $No_x$ and Soot in Diesel Egines Under a New Combustion System," Paper No. 205; 1996 Spring Symposium, Automotive Engineers of Japan, pp. 81–84.

Primary Examiner—Thomas Denion
Assistant Examiner—Binh Tran
Attorney, Agent, or Firm—Oliff & Berridge, PLC

[57] ABSTRACT

A compression ignition type engine, wherein a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks are selectively switched between and where the second combustion is switched to the first combustion when the temperature of the catalyst arranged in an engine exhaust passage is about to fall below the activation temperature.

20 Claims, 29 Drawing Sheets

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NO and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, they found that the amount of NOx produced at this time was extremely small. They engaged in further studies later based on this discovery to determine the reasons why soot was not produced and as a result constructed a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

In this new method of combustion, however, the temperature of the burned gas in the combustion chamber becomes much higher with respect to the same required load compared with the conventionally performed ordinary combustion, therefore not only does the exhaust gas from the combustion chamber become very high, but also the amounts of the unburnt HC and CO exhausted from the combustion chamber increase greatly. In this way, in this new method of combustion, in addition to the fact that almost no soot and NOx are produced, the temperature of the burned gas and the temperature of the exhaust gas become high and the amounts of the unburnt HC and CO exhausted from the combustion chamber increase greatly, so this new method of combustion can not only prevent air pollution, but also meet various other needs. For example, if the temperature of the burned gas becomes high, it is possible to improve engine warmup, so when desiring to improve engine warmup, the conventionally performed ordinary combustion is not performed, but the new combustion is performed to meet the need for improvement of engine warmup. Further, since the temperature of the exhaust gas is low in the conventionally performed ordinary combustion, there is the danger that the catalyst provided in the engine exhaust passage will become inactive in state. If the new combustion is used in this case as well, the temperature of the exhaust gas rises, so the temperature of the catalyst rises and therefore it is possible to maintain the catalyst in the active state. In particular, when the catalyst arranged in the engine exhaust passage has an oxidation function, if the new combustion is used, it is possible to raise the temperature of the catalyst by the heat of the oxidation reaction of the large amounts of unburnt HC and CO exhausted from the combustion chamber and therefore possible to maintain the catalyst in the active state.

SUMMARY OF THE INVENTION

An object of the present invention is to provide a compression ignition type engine capable of increasing the temperature of burned gas in the combustion chamber when the temperature of the burned gas in the combustion chamber should be increased.

According to the present invention, there is provided a compression ignition type engine in which an amount of production of soot gradually increases and then peaks when an amount of recirculated exhaust gas supplied in a combustion chamber increases and in which a further increase of the amount of recirculated exhaust gas supplied in the combustion chamber results in a temperature of fuel and surrounding gas in the combustion chamber becoming lower than a temperature of production of soot and therefore almost no production of soot any longer, said engine comprising: switching means for selectively switching between a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks and; judging means for judging one of if the temperature of burned gas in the combustion chamber should be raised and if the amounts of unburned HC and CO exhausted from the combustion chamber should be increased, the switching means switching from the second combustion to the first combustion when it is judged by the judging means that the temperature of burned gas in the combustion chamber should be raised or the amounts of unburned HC and CO exhausted from the combustion chamber should be increased when the second combustion is being performed.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
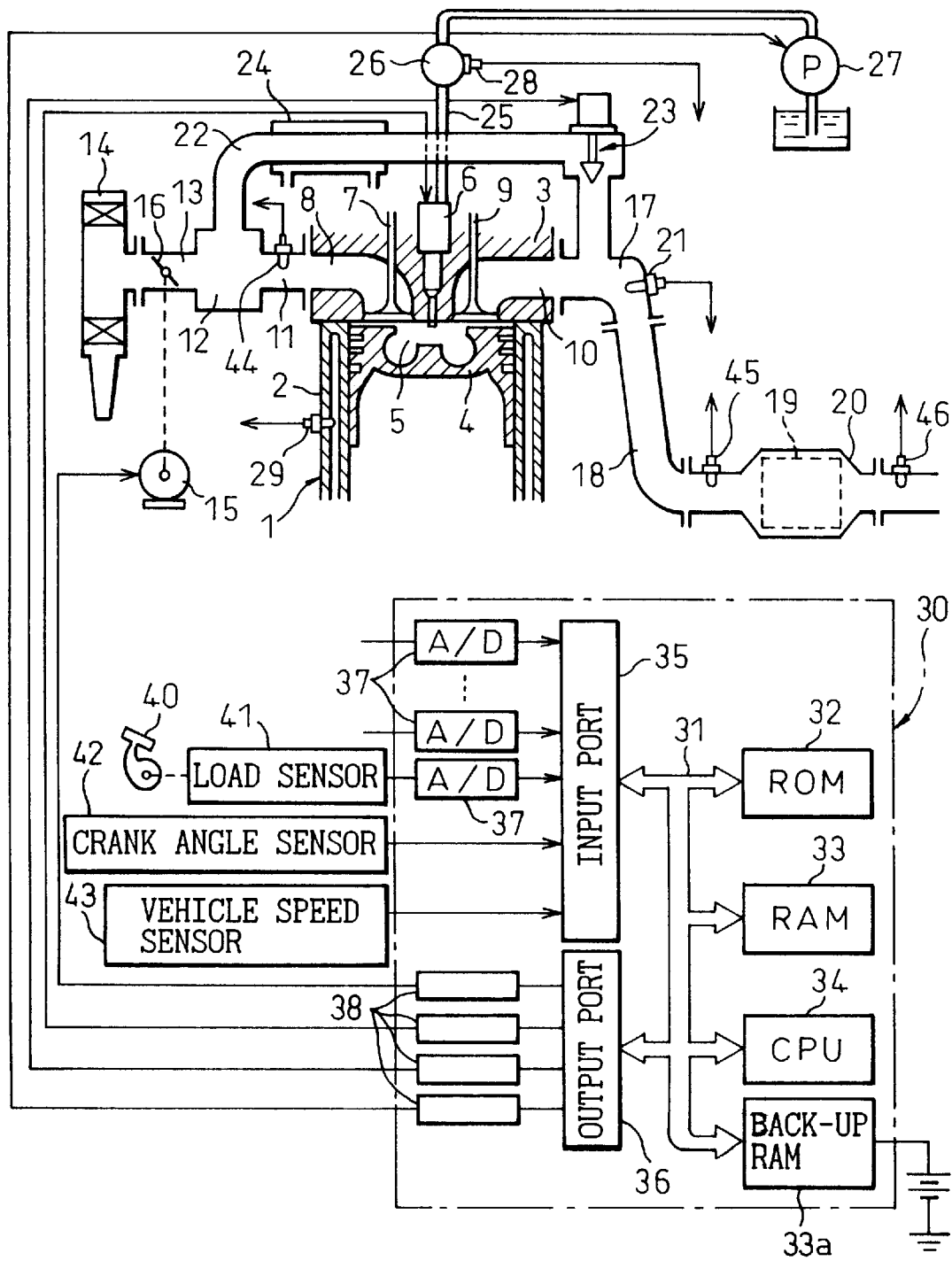
FIG. 1 is an overall view of a compression ignition type engine.

FIG. 1 is a view of the case of application of the present invention to a four-stroke compression ignition type engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation action. An air-fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Further, a cooling apparatus 24 for cooling the EGR gas flowing through the EGR passage 22 is provided around the EGR passage 22. In the embodiment shown in FIG. 1, the engine cooling water is guided to the cooling apparatus 24 where the engine cooling water is used to cool the EGR gas.

On the other hand, each fuel injector 6 is connected through a fuel supply tube 25 to the fuel reservoir, that is, a common rail 26. Fuel is supplied to the common rail 26 from an electrically controlled variable discharge fuel pump 27. Fuel supplied in the common rail 26 is supplied through each fuel supply tube 25 to the fuel injectors 6. A fuel pressure sensor 28 for detecting the fuel pressure in the common rail 26 is attached to the common rail 26. The amount of discharge of the fuel pump 27 is controlled based on the output signal of the fuel pressure sensor 28 so that the fuel pressure in the common rail 26 becomes the target fuel pressure.

The electronic control unit 30 is comprised of a digital computer and is provided with a ROM (read only memory) 32, a RAM (random access memory) 33, a CPU (microprocessor) 34, a backup RAM 33*a* connected to a power source, an input port 35, and an output port 36 connected with each other by a bidirectional bus 31. The output signal of the air-fuel ratio sensor 21 is input through a corresponding AD converter 37 to the input port 35. Further, the output signal of the fuel pressure sensor 28 is input through a corresponding AD converter 37 to the input port 35. The engine body 1 is provided with a temperature sensor 29 for detecting the engine, cooling water temperature. The output signal of this temperature sensor 29 is input through a corresponding AD converter 37 to the input port 35. Further, a temperature sensor 44 for detecting the temperature of the mixed gas of the suction air and the EGR gas is mounted in at least one of the intake tubes 11. The output signal of the temperature sensor 44 is input through a corresponding AD converter 37 to the input port 35. Further, a temperature sensor 45 for detecting the temperature of the exhaust gas flowing into the catalyst 19 is arranged in the exhaust passage upstream of the catalyst 19, while a temperature sensor 46 for detecting the temperature of the exhaust gas flowing out from the catalyst 19 is arranged in the exhaust passage downstream of the catalyst 19. The output signals of these temperature sensors 45 and 46 are input through the corresponding AD converters 37 to the input port 35.

The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. Further, the input port 35 receives as input an output pulse of a vehicle speed sensor 43 showing the vehicle speed. On the other hand, the output port 36 has connected to it through a corresponding drive circuit 38 the fuel injector 6, electric motor 15, EGR control valve 23, and fuel pump 27.

Figure 2:
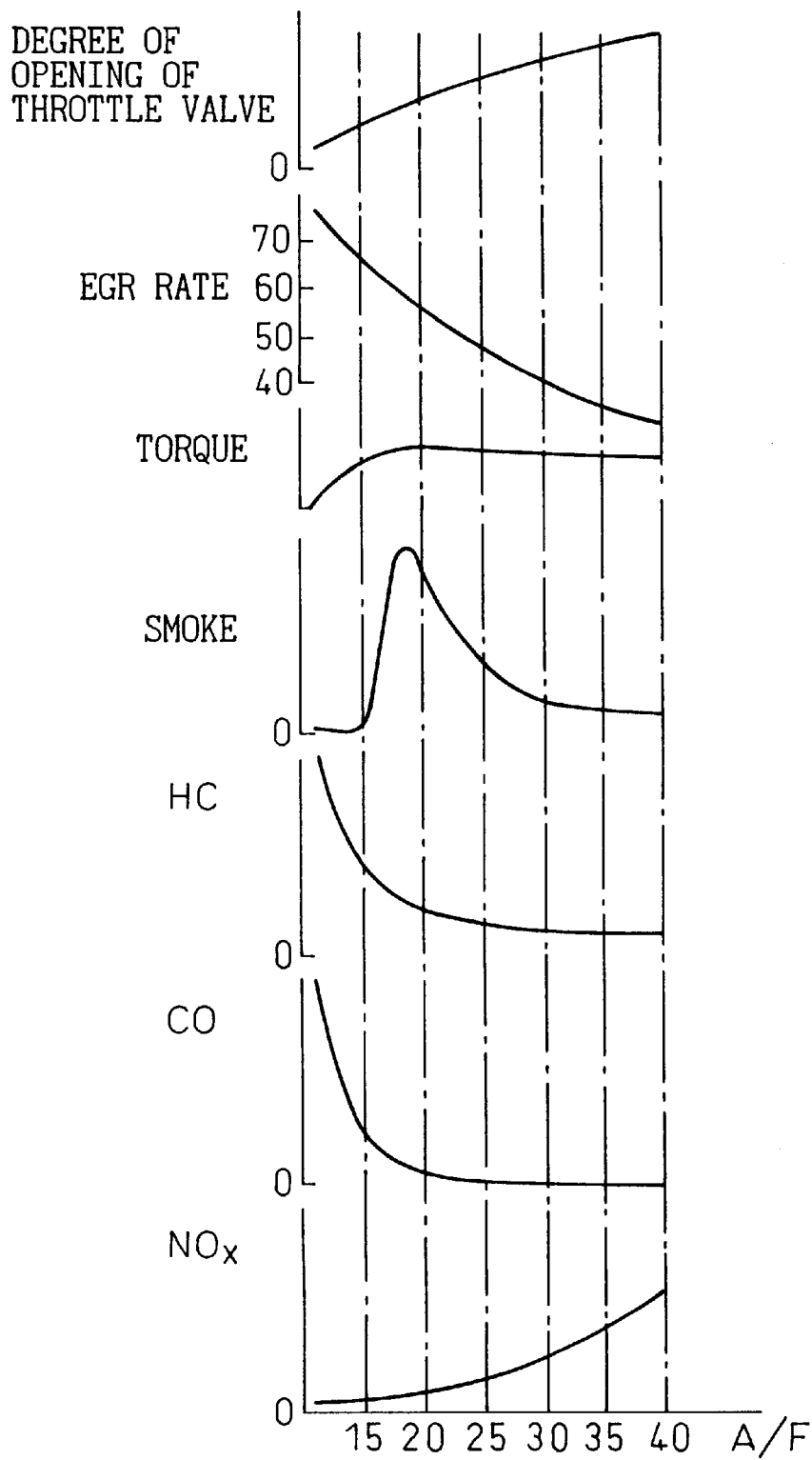
FIG. 2 is a view of the amount of generation of smoke and NOx.

FIG. 2 shows an example of an experiment showing the changes in the output torque and the changes in the amount of smoke, HC, CO, and NOx exhausted when changing the air-fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air-fuel ratio A/F. When below the stoichiometric air-fuel ratio (≈14.6), the EGR rate becomes over 65 percent.

As shown in FIG. 2, if increasing the EGR rate to reduce the air-fuel ratio A/F, when the EGR rate becomes close to 40 percent and the air-fuel ratio A/F becomes 30 degrees, the amount of smoke produced starts to increase. Next, when the EGR rate is further raised and the air-fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air-fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
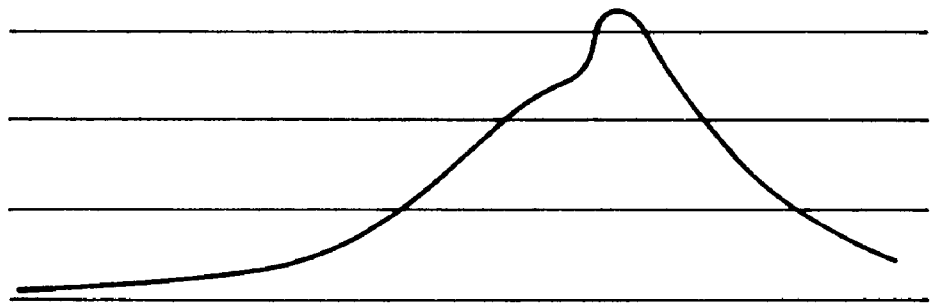
FIGS. 3A and 3B are views of the combustion pressure.
Figure 3B:
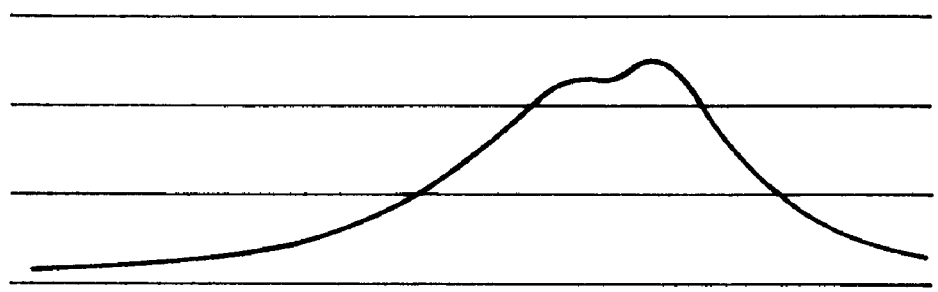

FIG. 3A shows the changes in compression pressure in the combustion chamber 5 when the amount of smoke produced is the greatest near an air-fuel ratio A/F of 21. FIG. 3B shows the changes in compression pressure in the combustion chamber 5 when the amount of smoke produced is substantially zero near an air-fuel ratio A/F of 18. As will be understood from a comparison of FIG. 3A and FIG. 3B, the combustion pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air-fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 3A and 3B. That is, in the state shown in FIG. 3B where almost no soot is produced, the combustion pressure becomes lower, therefore the combustion temperature in the combustion chamber 5 becomes lower at this time.

Figure 4:
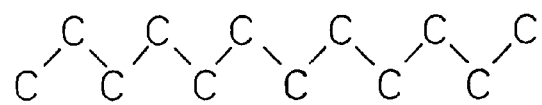
FIG. 4 is a view of a fuel molecule.
Figure 4:
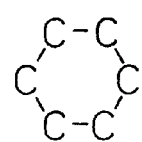
Figure 4:
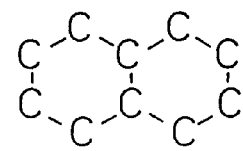

Second, when the amount of smoke produced, that is, the amount of soot produced, becomes substantially zero, as shown in FIG. 2, the amounts of HC and CO exhausted increase. This means that the hydrocarbons are exhausted without growing into soot. That is, the straight chain hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperatures of the fuel and the gas around the fuel in the combustion chamber 5 are below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperatures of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

Figure 5:
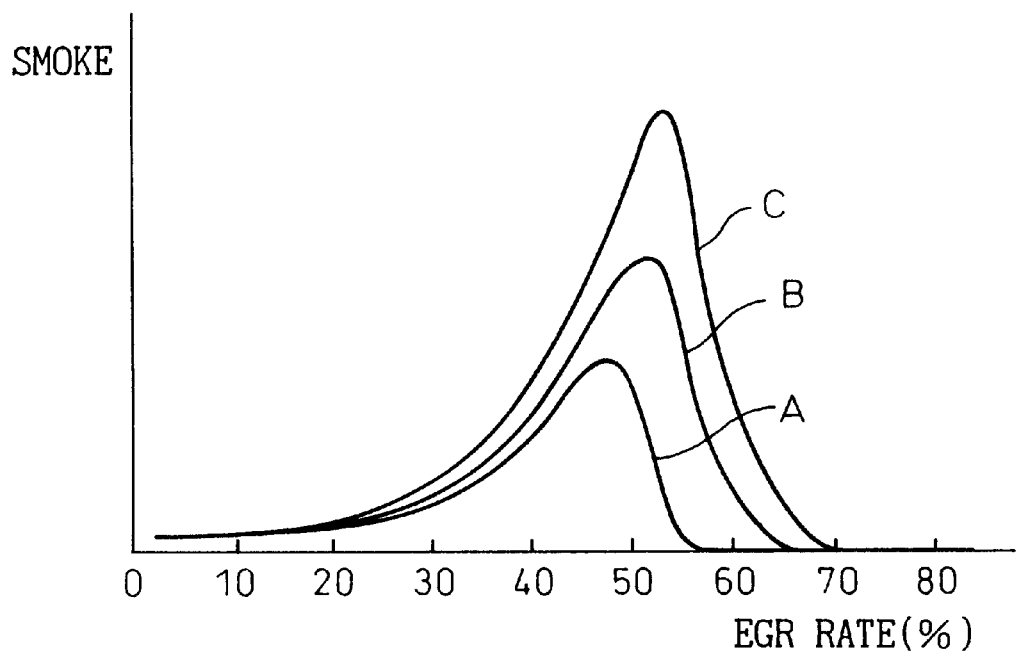
FIG. 5 is a view of the relationship between the amount of smoke produced and the EGR rate.

FIG. 5 shows the relationship between the EGR rate and smoke when changing the degree of cooling of the EGR gas using the EGR gas as an inert gas. That is, in FIG. 5, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 5, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 5, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 5, when not force cooling the EGR gas, the amount of soot produced peaks when the EGR rate is near 55 percent. In this case, almost no soot is produced any longer when the EGR rate is made at least about 70 percent.

Note that FIG. 5 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 6:
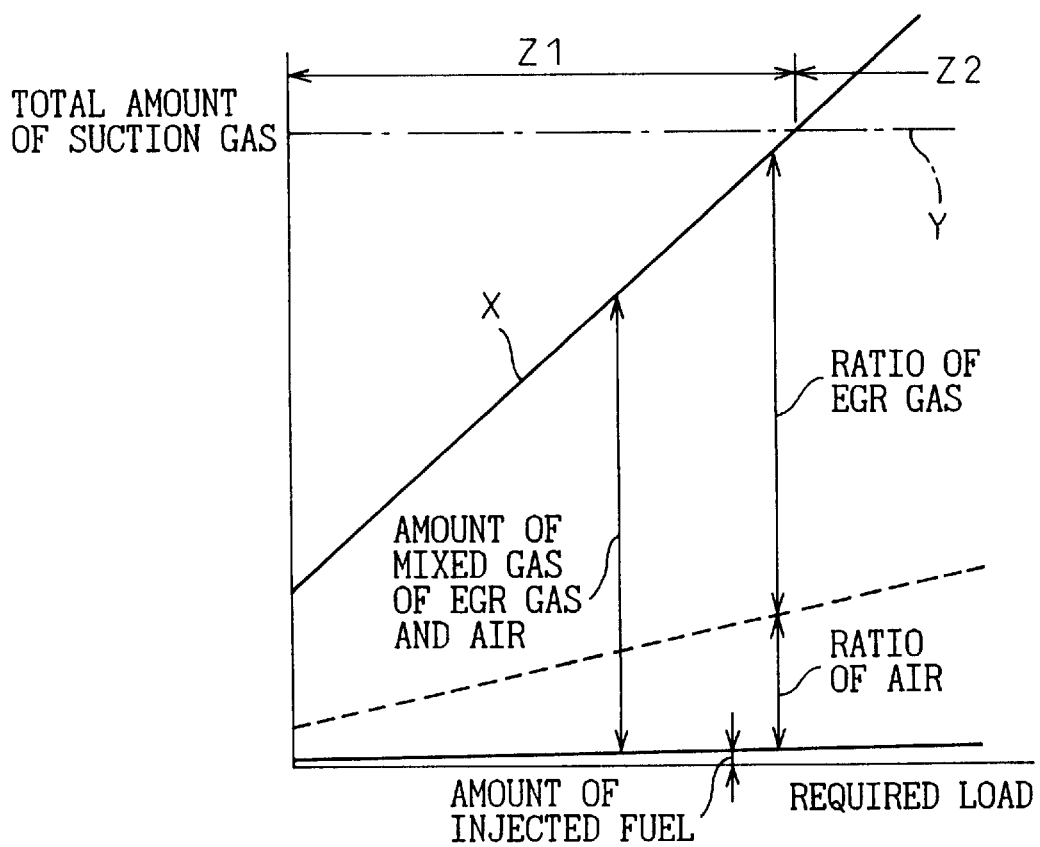
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air-fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent and, in the embodiment shown in FIG. 6, is at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air-fuel ratio is rich.

As explained above, FIG. 6 shows the case of combustion of fuel at the stoichiometric air-fuel ratio. In the low load operating region Z1 shown in FIG. 6, even if the amount of air is made smaller than the amount of air shown in FIG. 6, that is, even if the air-fuel ratio is made rich, it is possible to obstruct the production of soot and make the amount of NOx produced around 10 ppm or less. Further, in the low load region Z1 shown in FIG. 6, even if the amount of air is made greater than the amount of air shown in FIG. 6, that is, the average value of the air-fuel ratio is made a lean 17 to 18, it is possible to obstruct the production of soot and make the amount of NOx produced around 10 ppm or less.

That is, when the air-fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the average air-fuel ratio is lean or when the air-fuel ratio is the stoichiometric air-fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air-fuel ratio, that is, whether the air-fuel ratio is rich or the stoichiometric air-fuel ratio or the average air-fuel ratio is lean, no soot is produced and the amount of NOx produced becomes extremely small. Therefore, considering the improvement of the fuel efficiency, it may be said to be preferable to make the average air-fuel ratio lean.

It is however only possible to suppress the temperature of the fuel and the gas surrounding it at the time of combustion in the combustion chamber to less than the temperature where the growth of the hydrocarbons is stopped midway at the time of a relatively low engine load where the amount of heat generated by the combustion is small. Accordingly, in the present invention, when the engine load is relatively low, the temperature of the fuel and the gas surrounding it is suppressed to less than the temperature where the growth of the hydrocarbons stops midway and first combustion, that is, low temperature combustion, is performed. When the engine load is relatively high, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7A:
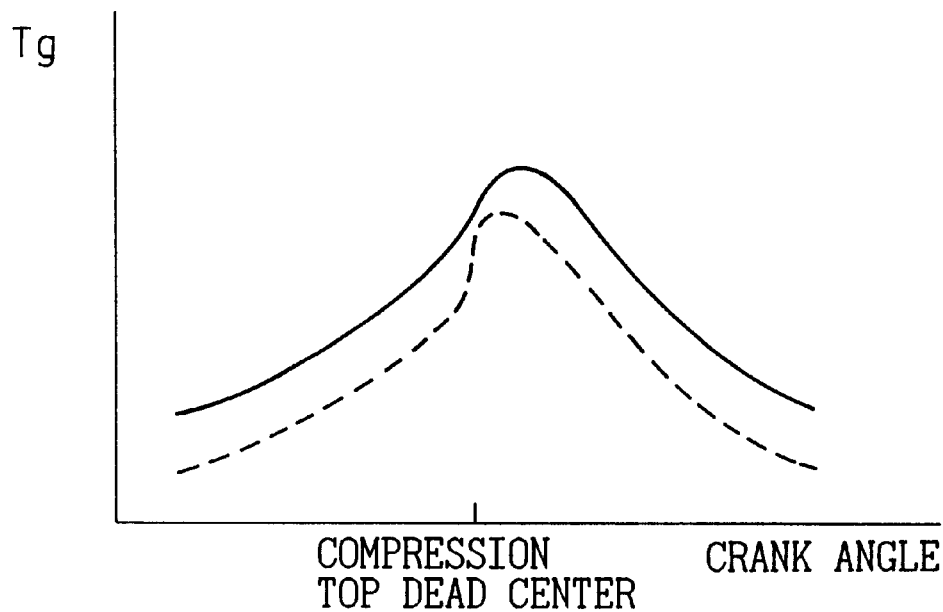
FIGS. 7A and 7B are views of the change in the average gas temperature Tg in the combustion chamber and the temperature Tf of the fuel and the gas around it.
Figure 7B:
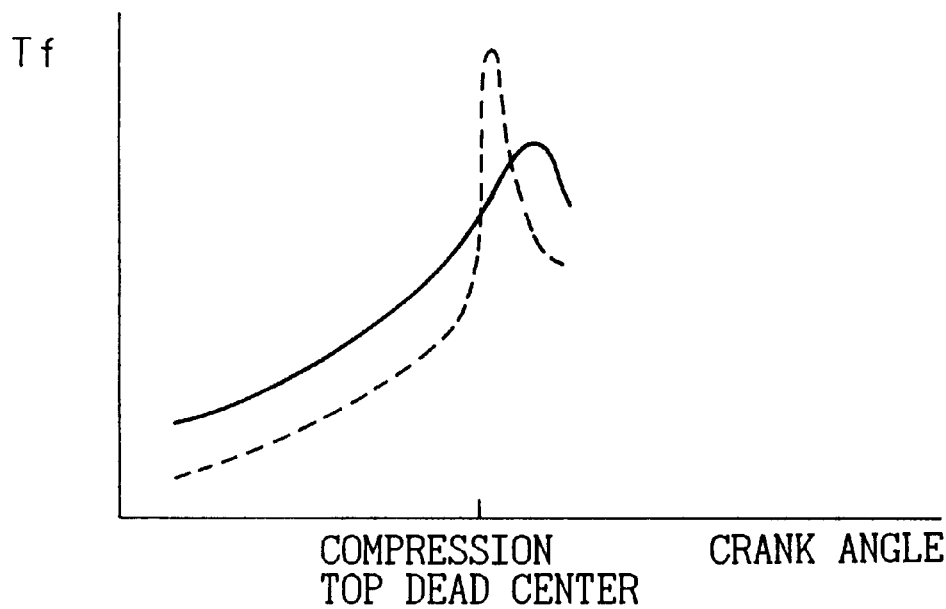

The solid line in FIG. 7A shows the relationship between the average gas temperature Tg in the combustion chamber 5 when the first combustion is performed and the crank angle. The broken line in FIG. 7A shows the relationship between the average gas temperature Tg in the combustion chamber 5 when the second combustion is performed and the crank angle. Further, the solid line in FIG. 7B shows the relationship between the temperature Tf of the fuel and the gas surrounding it when first combustion is being performed and the crank angle. The broken line in FIG. 7B shows the relationship between the temperature Tf of the fuel and the gas surrounding it when the second combustion is being performed and the crank angle.

When the first combustion, that is, the low temperature combustion, is being performed, the amount of EGR gas is larger compared with when the second combustion, that is, the conventional ordinary combustion, is being performed, therefore as shown in FIG. 7A, before top dead center of the compression stroke, that is, during the compression stroke, the average temperature Tg of the gas at the time of the first combustion shown by the solid line becomes higher than the average temperature Tg of the gas at the time of the second combustion shown by the broken line. Note that at this time, as shown by FIG. 7B, the temperature Tf of the fuel and the gas around it becomes substantially the same temperature as the average temperature Tg of the gas.

Next, combustion is started near top dead center of the compression stroke, but in this case, when first combustion is being performed, as shown by the solid line in FIG. 7B, the temperature Tf of the fuel and the gas around it does not become that high. As opposed to this, when second combustion is being performed, as shown by the broken line in FIG. 7B, the temperature Tf of the fuel and the gas around it becomes extremely high. When second combustion is being performed in this way, the temperature Tf of the fuel and the gas around it becomes considerably higher than when the first combustion is being performed, but the temperature of the other gas, constituting the major part, becomes lower when the second combustion is being performed compared with when the first combustion is being performed. Therefore, as shown by FIG. 7A, the average temperature Tg of the gas in the combustion chamber 5 near top dead center of the compression stroke becomes higher when the first combustion is being performed compared with when the second combustion is being performed. As a result, as shown by FIG. 7A, the average temperature Tg of the gas in the combustion chamber 5 after the end of the combustion, that is, in the latter half of the expansion stroke, in other words, the temperature of the burned gas in the combustion chamber 5, becomes higher when the first combustion is being performed compared with when the second combustion is being performed.

When the first combustion, that is, when the low temperature combustion, is being performed, compared with when the second combustion is being performed, the temperature Tf of the fuel and the gas around it at the time of combustion becomes considerably low, but the burned gas in the combustion chamber 5 becomes conversely higher compared with when the second combustion is performed, therefore the temperature of the exhaust gas from the combustion chamber 5 also becomes higher compared with when the second combustion is performed.

Figure 8:
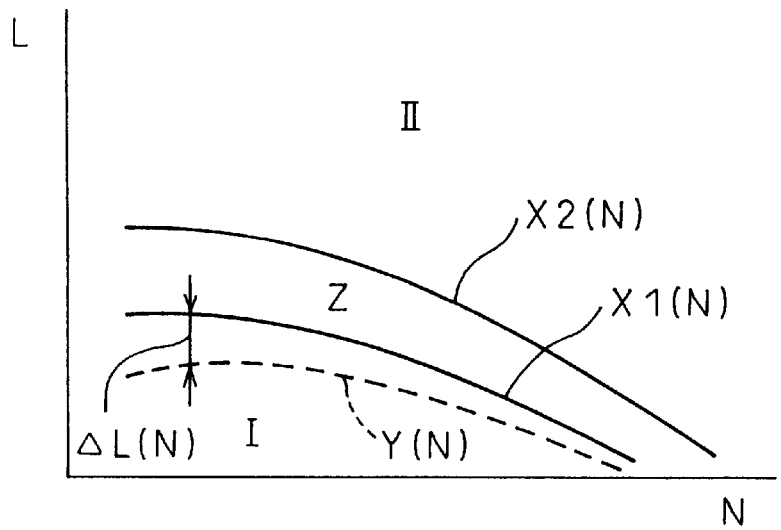
FIG. 8 is a view of a first operating region I, a second operating region II, and a boundary region Z.

FIG. 8 shows a first operating region I where the first combustion, that is, the low temperature combustion, is performed, a second operating region II where the second combustion, that is, the combustion by the conventional combustion method, is performed, and a boundary region Z between the first operating region I and the second operating region II where the first combustion and the second combustion are selectively performed. Note that in FIG. 8, the abscissa L shows the amount of depression of the accelerator pedal 40, that is, the required load, and the ordinate N shows the engine rotational speed. Further, in FIG. 8, X1(N) shows a first boundary between the first operating region I and the boundary region Z, and Y(N) shows a second boundary between the first operating region I and the boundary region Z. The change of the operating region from the first operating region I to the boundary region Z is judged based on the first boundary X1(N), while the change of the operating region from the boundary region Z to the first operating region I is judged based on the second boundary Y(N). Further, X2(N) shows the third boundary between the boundary region Z and the second operating region II.

As shown above, in the boundary region Z, the first combustion and the second combustion are selectively performed, but normally second combustion is performed. Therefore, when the engine operating region is the first operating region I and low temperature combustion is being performed, if the required load L exceeds the first boundary X1(N), which is a function of the engine rotational speed N, normally second combustion is performed, then when the required load L becomes lower than the second boundary Y(N), which is a function of the engine rotational speed N, low temperature combustion again is performed.

Figure 9:
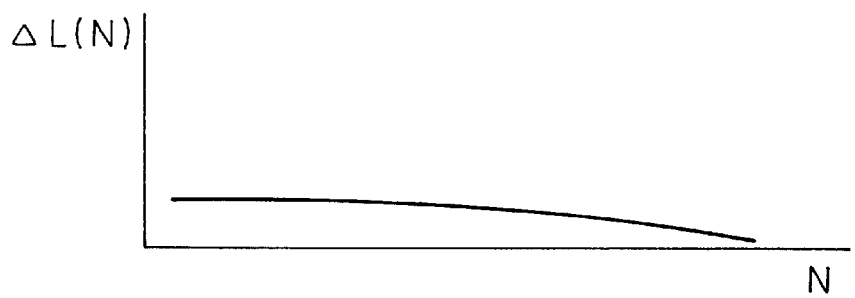
FIG. 9 is a view of the relationship between AL(N) and the engine rotational speed N.

Note that in this embodiment of the present invention, the second boundary Y(N) is made the low load side from the first boundary X(N) by exactly ΔL(N). As shown in FIG. 8 and FIG. 9, ΔL(N) is a function of the engine rotational speed N. ΔL(N) becomes smaller the higher the engine rotational speed N.

When low temperature combustion is being performed when the engine is operating in the first operating region I, almost no soot is produced, but instead the unburnt hydrocarbons are exhausted from the combustion chamber 5 in the form of a soot precursor or a state before that. At this time, the unburnt hydrocarbons exhausted from the combustion chamber 5 may be oxidized by the catalyst 19 having the oxidation function.

As the catalyst 19, an oxidation catalyst, three-way catalyst, or NOx absorbent may be used. An NOx absorbent has the function of absorbing the NOx when the average air-fuel ratio in the combustion chamber 5 is lean and releasing the NOx when the average air-fuel ratio in the combustion chamber 5 becomes rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal is carried.

The oxidation catalyst, of course, and also the three-way catalyst and NOx absorbent have an oxidation function, therefore the three-way catalyst and NOx absorbent can be used as the catalyst 19 as explained above.

Figure 10:
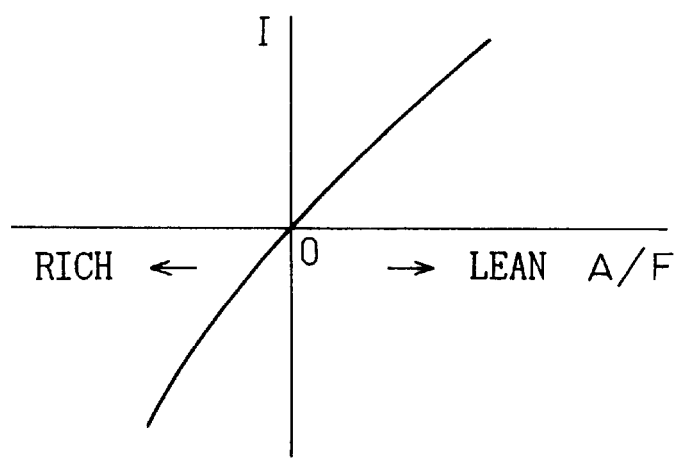
FIG. 10 is a view of the output of the air-fuel ratio sensor.

FIG. 10 shows the output of the air-fuel ratio sensor 21. As shown in FIG. 10, the output current I of the air-fuel ratio sensor 21 changes in accordance with the air-fuel ratio A/F. Therefore, it is possible to determine the air-fuel ratio from the output current I of the air-fuel ratio sensor 21.

As explained above, in the boundary region Z, normally second combustion is performed. The control of the operation in the operating regions in this case will be explained next with reference to FIG. 11.

Figure 11:
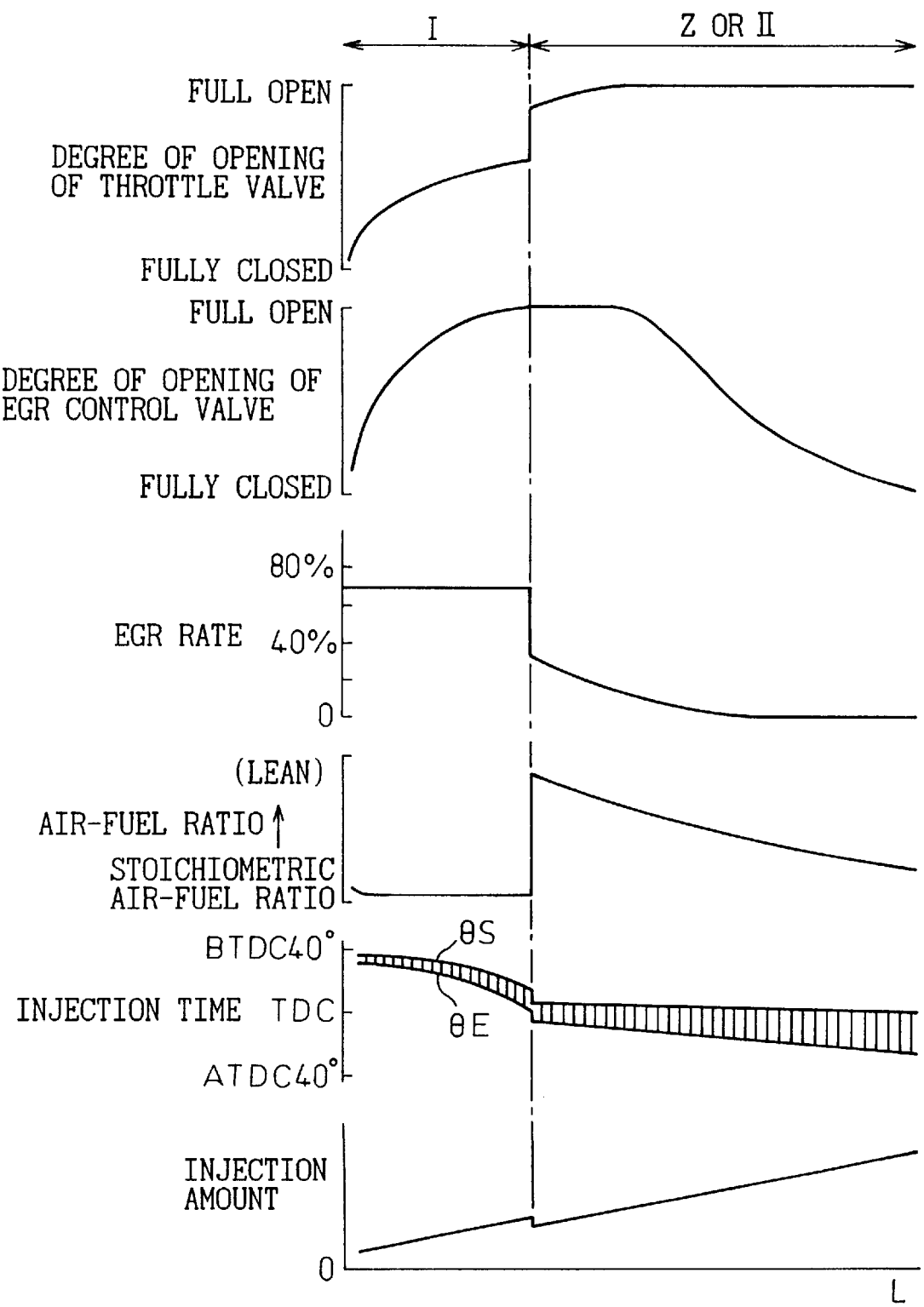
FIG. 11 is a view of the opening degree of a throttle valve etc.

FIG. 11 shows the opening degrees of the throttle valve 16, the opening degree of the EGR control valve 23, the EGR rate, the air-fuel ratio, the injection timing, and the amount of injection with respect to the required load L. As shown in FIG. 11, in the first operating region I with the low required load L, the opening degree of the throttle valve 16 is gradually increased from close to the fully closed state to the half opened state as the required load L becomes higher, while the opening degree of the EGR control valve 23 is gradually increased from close to the fully closed state to the fully opened state as the required load L becomes higher. Further, in the example shown in FIG. 11, in the first operating region I, the EGR rate is made about 70 percent and the air-fuel ratio is made a lean air-fuel ratio from 15 to 18.

In other words, in the first operating region I, the opening degree of the throttle valve 16 and the opening degree of the EGR control valve 23 are controlled so that the EGR rate becomes about 70 percent and the air-fuel ratio becomes a lean air-fuel ratio of 15 to 18. Note that at this time, the air-fuel ratio is controlled to the target lean air-fuel ratio by correcting the opening degree of the EGR control valve 23 based on the output signal of the air-fuel ratio sensor 21. Further, in the first operating region I, the fuel is injected before top dead center of the compression stroke TDC. In this case, the injection start timing θS becomes later the higher the required load L. The injection end timing θE also becomes later the later the injection start timing θS.

Note that, during idling operation, the throttle valve 16 is made to close to close to the fully closed state. At this time, the EGR control valve 23 is also made to close to close to the fully closed state. If the throttle valve 16 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 16 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 19.

On the other hand, if the engine operating state changes from the first operating region I to the boundary region Z or the second operating region II, the opening degree of the throttle valve 16 is increased in a step-like manner from the half opened state to the fully opened state. At this time, in the example shown in FIG. 11, the EGR rate is reduced in a step-like manner from about 70 percent to less than 40 percent and the air-fuel ratio is increased in a step-like manner. That is, since the EGR rate jumps over the range of EGR rates (FIG. 5) where a large amount of smoke is produced, there is no longer a large amount of smoke produced when the engine operating state changes from the first operating region I to the boundary region Z or the second operating region II.

In the boundary region Z or the second operating region II, the conventionally performed combustion is performed. In this combustion method, some soot and NOx are produced, but the heat efficiency is higher than with the low temperature combustion, so if the engine operating state changes from the first operating region I to the boundary region Z or the second operating region II, the amount of injection is reduced in a step-like manner as shown in FIG. 11.

In the boundary region Z or the second operating region II, the throttle valve 16 is held in the fully opened state except in portions and the opening degree of the EGR control valve 23 is gradually made smaller then higher the required load L. Therefore, in the boundary region Z or the operating region II, the EGR rate becomes lower the higher the required load L and the air-fuel ratio becomes smaller the higher the required load L. Even if the required load L becomes high, however, the air-fuel ratio is made a lean air-fuel ratio. Further, in the boundary region Z or the second operating region II, the injection start timing $\theta S$ is made close to top dead center of the compression stroke TDC.

The range of the first operating region I where low temperature combustion is possible and the range of the boundary region Z where low temperature combustion is possible changes according to the temperature of the gas in the combustion chamber 5 at the start of compression and the temperature of the surface of the inside wall of the cylinder. That is, if the required load becomes high and the amount of heat generated due to the combustion increases, the temperature of the fuel and its surrounding gas at the time of combustion becomes high and therefore low temperature combustion can no longer be performed. On the other hand, when the temperature of the gas TG in the combustion chamber 5 at the start of compression becomes low, the temperature of the gas in the combustion chamber 5 directly before when the combustion was started becomes lower, so the temperature of the fuel and its surrounding gas at the time of combustion becomes low. Accordingly, if the temperature of the gas TG in the combustion chamber 5 at the start of compression becomes low, even if the amount of heat generated by the combustion increases, that is, even if the required load becomes high, the temperature of the fuel and its surrounding gas at the time of combustion does not become high and therefore low temperature combustion is performed. In other words, the lower the temperature of the gas TG in the combustion chamber 5 at the start of compression, the more the first operating region I where low temperature combustion can be performed expands to the high load side and the boundary region Z where low temperature combustion is performed expands to the high load side.

Further, the smaller the temperature difference (TW−TG) between the temperature TW of the cylinder inner wall and the temperature of the gas TG in the combustion chamber 5 at the start of compression, the more the amount of heat escaping through the cylinder inner wall during the compression stroke. Therefore, the smaller this temperature difference (TW−TG), the smaller the amount of rise of temperature of the gas in the combustion chamber 5 during the compression stroke and therefore the lower the temperature of the fuel and its surrounding gas at the time of combustion. Accordingly, the smaller the temperature difference (TW−TG), the more the first operating region I where low temperature combustion can be performed expands to the high load side and the more the boundary region where low temperature combustion can be performed expands to the high temperature side.

Figure 12:
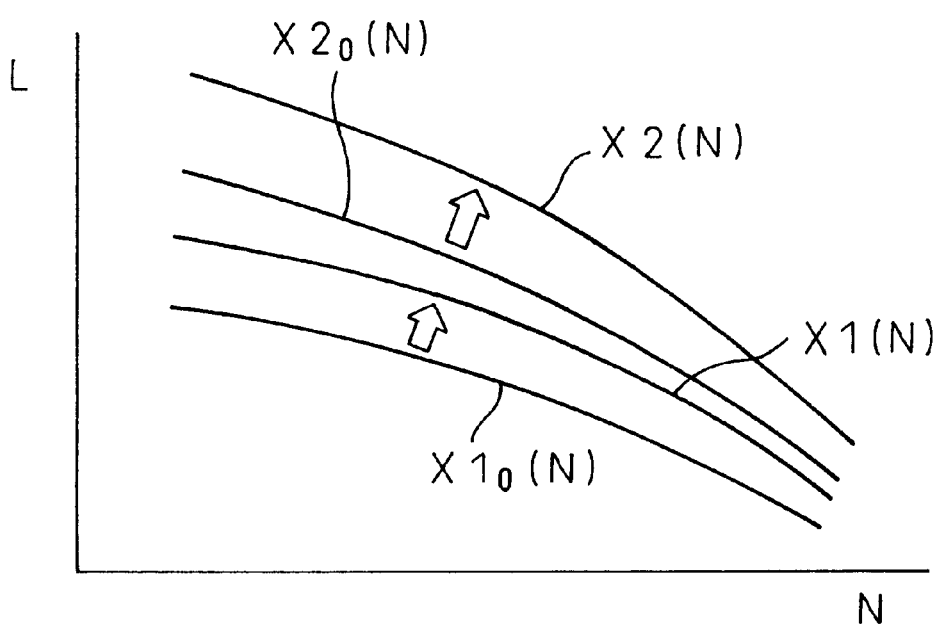
FIG. 12 is a view explaining the method of control of a first boundary X1(N) and a third boundary X2(N)

In this embodiment according to the present invention, when the temperature of the gas TG in the combustion chamber 5 becomes low, as shown in FIG. 12, the first boundary is made to shift from $X1_0(N)$ to $X1(N)$. When the temperature difference (TW−TG) becomes small, as shown in FIG. 12, the first boundary is made to shift from $X1_0(N)$ to $X1(N)$. Note that here, $X1_0(N)$ shows the reference first boundary. The reference first boundary $X1(N)$ is a function of the engine rotational speed N. $X1(N)$ is calculated using this $X1_0(N)$ based on the following equations:

$$X1(N)=X1_0(N)+K(T)\cdot K(N)$$

$$K(T)=K(T)_1+K(T)_2$$

Further, in this embodiment according to the present invention, when the temperature of the gas TG in the combustion chamber 5 becomes low, as shown in FIG. 12, the third boundary is made to shift from $X2_0(N)$ to $X2(N)$. When the temperature difference (TW−TG) becomes small, as shown in FIG. 12, the third boundary is made to shift from $X2_0(N)$ to $X2(N)$. Note that here, $X2_0(N)$ shows the reference third boundary. The reference third boundary $X2_0(N)$ is a function of the engine rotational speed N. $X2(N)$ is calculated using this $X2_0(N)$ based on the following equations:

$$X2(N)=X2_0(N)+K(T)-K(N)$$

$$K(T)=K(T)_1+K(T)_2$$

Figure 13A:
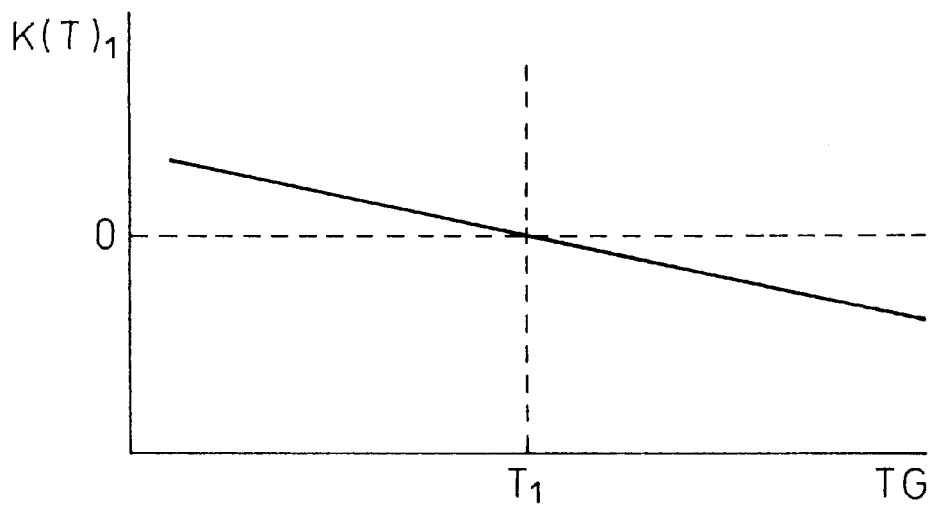
FIGS. 13A to 13C are views of $K(T)_1$, $K(T)_2$, and $K(N)$.
Figure 13B:
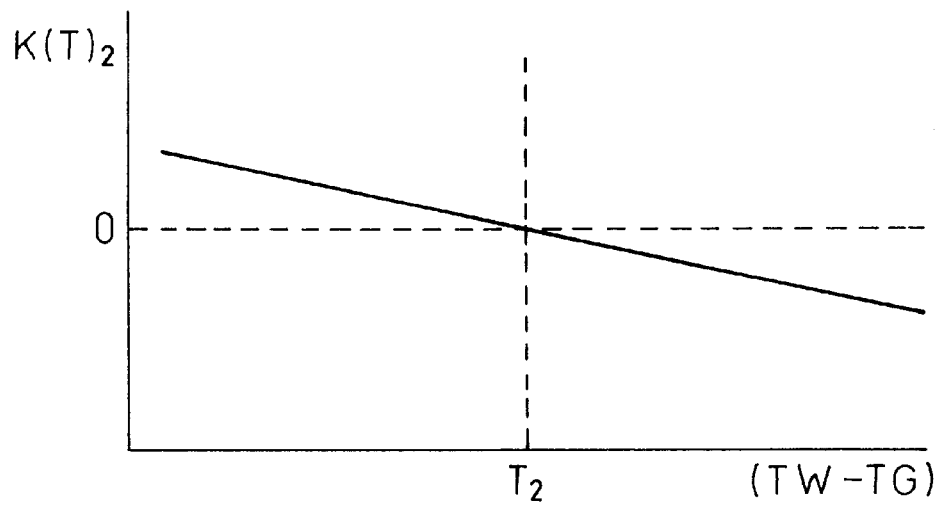

Here, $K(T)_1$, as shown in FIG. 13A, is a function of the temperature of the gas TG in the combustion chamber 5 at the start of compression. The value of $K(T)_1$ becomes larger the lower the temperature of the gas TG in the combustion chamber 5 at the start of compression. Further, $K(T)_2$ is a function of the temperature difference (TW−TG) as shown in FIG. 13B. The value of $K(T)_2$ becomes larger the smaller the temperature difference (TW−TG). Note that in FIG. 13A and FIG. 13B, $T_1$ is the reference temperature and $T_2$ is the reference temperature difference. When TG=$T_1$ and (TW−TG)=$T_2$, the first boundary becomes $X1_0(N)$ of FIG. 12 and the third boundary becomes $X2_0(N)$ of FIG. 12.

Figure 13C:
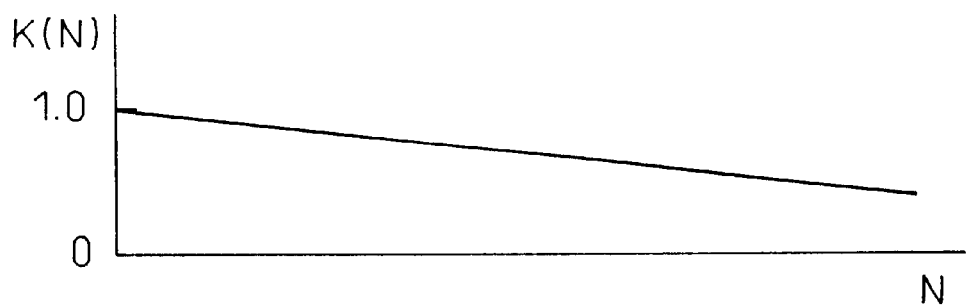

On the other hand, K(N) is a function of the engine rotational speed N as shown in FIG. 13C. The value of K(N) becomes smaller the higher the engine rotational speed N. That is, when the temperature of the gas TG in the combustion chamber 5 at the start of compression becomes lower than the reference temperature $T_1$, the lower the temperature of the gas TG in the combustion chamber 5 at the start of compression, the more the first boundary $X1(N)$ shifts to the high load side with respect to $X1_0(N)$. When the temperature difference (TW−TG) becomes lower than the reference temperature difference $T_2$, the smaller the temperature difference (TW−TG), the more the first boundary $X(N)$ shifts to the high load side with respect to $X_0(N)$. Further, the amount of shift of $X1(N)$ with respect to $X1_0(N)$ becomes smaller the higher the engine rotational speed N.

Further, when the temperature of the gas TG in the combustion chamber 5 at the start of compression becomes lower than the reference temperature $T_1$, the lower the temperature of the gas TG in the combustion chamber 5 at the start of compression, the more the third boundary X2(N) shifts to the high load side with respect to $X2_0(N)$. When the temperature difference (TW−TG) becomes lower than the reference temperature difference $T_2$, the smaller the temperature difference (TW−TG), the more the third boundary X2(N) shifts to the high load side with respect to $X2_0(N)$. Further, the amount of shift of X2(N) with respect to $X2_0(N)$ becomes smaller the higher the engine rotational speed N.

Figure 14A:
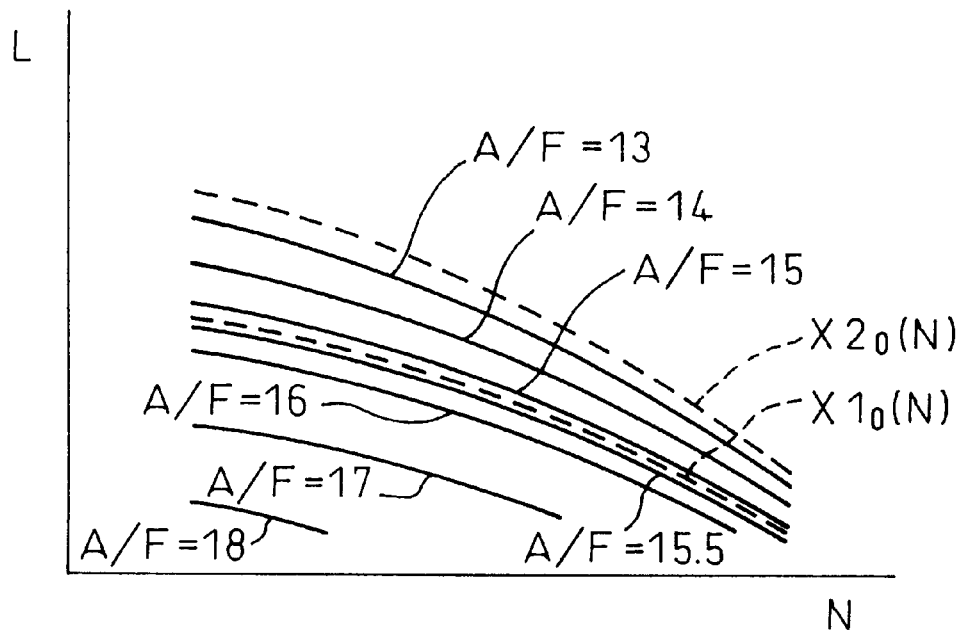
FIGS. 14A and 14B are views of the air-fuel ratio in the first operating region I and the boundary region Z.

FIG. 14A shows the air-fuel ratio A/F in the first operating region I when the first boundary is the reference first boundary $X1_0(N)$ and the third boundary is the reference third boundary $X2_0(N)$ and the air-fuel ratio A/F in the boundary region Z when the low temperature combustion is performed. In FIG. 14A, the curves shown by A/F=13, A/F=14, A/F=15, A/F=15.5, A/F=16, A/F=17, and A/F=18 show when the air-fuel ratio is 13, 14, 15, 15.5, 16, 17, and 18. The air-fuel ratios of the curves are determined by interpolation, that is, by proportional distribution.

As shown in FIG. 14A, in the first operating region, the air-fuel ratio becomes lean. Further, in the first operating region I, the air-fuel ratio A/F is made leaner the lower the required load L. That is, the lower the required load L, the smaller the amount of heat generated by the combustion. Accordingly, the lower the required load L, the more low temperature combustion can be performed even if the EGR rate is lowered. If the EGR rate is lowered, the air-fuel ratio becomes larger. Therefore, as shown in FIG. 14A, the air-fuel ratio A/F is made larger as the required load L becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required load L becomes.

On the other hand, the air-fuel ratio A/F in the boundary region Z when performing low temperature combustion becomes smaller the higher the required load L. When the required load L is low, it becomes lean, but when the required load L is high, it becomes rich. That is, the higher the required load L, the greater the amount of heat generated by the combustion. Accordingly, the higher the required load L, the more low temperature combustion cannot be performed unless the EGR rate is raised. If the EGR rate is raised, the air-fuel ratio becomes smaller. Therefore, as shown in FIG. 14A, the air-fuel ratio A/F is made smaller as the required load L becomes higher.

If the air-fuel ratio A/F becomes rich, however, the fuel efficiency deteriorates. Therefore, in the boundary region Z, second combustion Z is performed and, as needed, first combustion is performed.

Figure 14B:
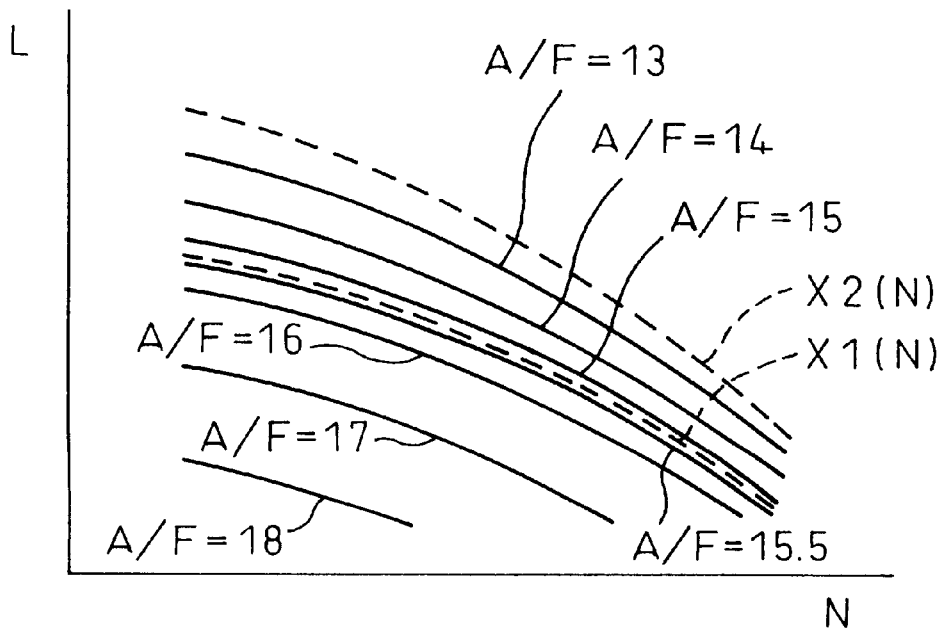

FIG. 14B shows the air-fuel ratio A/F in the first operating region I and the boundary region Z when the first boundary is X1(N) shown in FIG. 12 and the third boundary is X2(N) shown in FIG. 12. As will be understood if comparing FIG. 14A and FIG. 14B, when the first boundary X1(N) shifts to the high load side with respect to $X1_0(N)$ and the third boundary X2(N) shifts to the high load side with respect to $X2_0(N)$, the curves of A/F=13, A/F=14, A/F=15, A/F=15.5, A/F=16, A/F=17, and A/F=18 showing the air-fuel ratios also shift to the high load side following the same. Therefore, it is learned that when the boundaries X1(N) and X2N shift to the high load side with respect to $X1_0(N)$ and $X2_0(N)$, the air-fuel ratio A/F at the same required load L and the same engine rotational speed N becomes larger. That is, if the first operating region I and the boundary region Z are made to expand to the high load side, not only is the operating region where almost no soot and NOx are produced expanded, but also the fuel efficiency is improved.

Figure 15A:
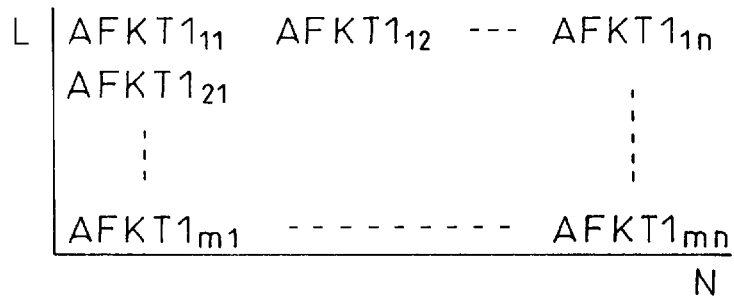
FIGS. 15A to 15D are views of a map of a target air-fuel ratio.
Figure 15B:
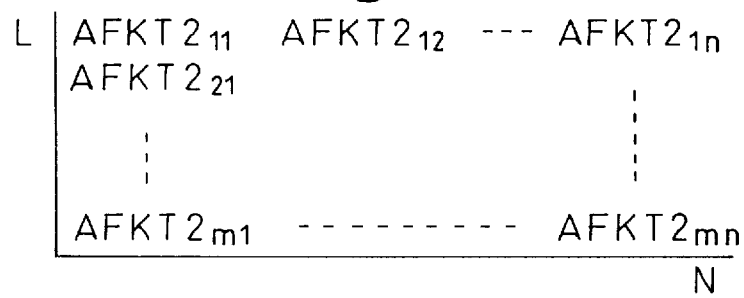
Figure 15C:
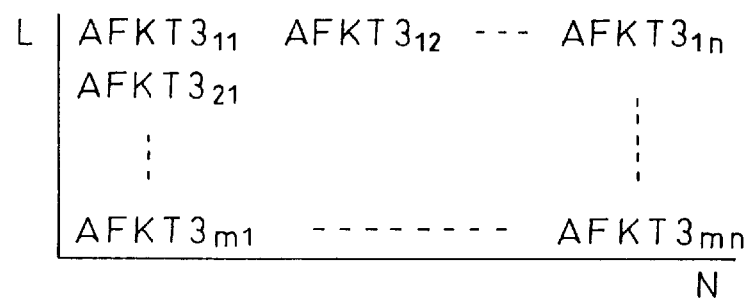
Figure 15D:
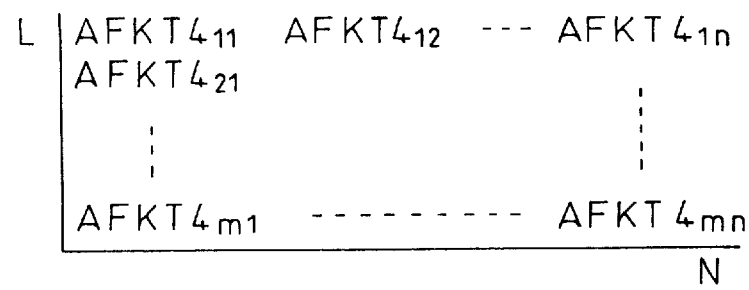

In this embodiment according to the present invention, the target air-fuel ratio in the first operating region I for various different first boundaries X1(N) and third boundaries X2(N) and the target air-fuel ratio in the boundary region Z where low temperature combustion is performed, that is, the target air-fuel ratios in the first operating region I for various values of K(T) and the boundary region Z, are stored in advance in the ROM 32 in the form of a map as a function of the required load L and the engine rotational speed N as shown in FIG. 15A to FIG. 15D. That is, FIG. 15A shows the target air-fuel ratio AFKT1 when the value of K(T) is KT1, FIG. 15B shows the target air-fuel ratio AFKT2 when the value of K(T) is KT2, FIG. 15C shows the target air-fuel ratio AFKT3 when the value of K(T) is KT3, and FIG. 15D shows the target air-fuel ratio AFKT4 when the value of K(T) is KT4.

On the other hand, the target opening degrees of the throttle valve 16 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 16A to FIG. 16D. Further, the target basic opening degrees of the EGR control valve 23 required for making the air-fuel ratio the target air-fuel ratios AFKT1, AFKT2, AKFT3, and AFKT4 are stored in advance in the ROM 32 in the form of a map as a function of the required load L and the engine rotational speed N as shown in FIG. 17A to FIG. 17D.

Figure 16A:
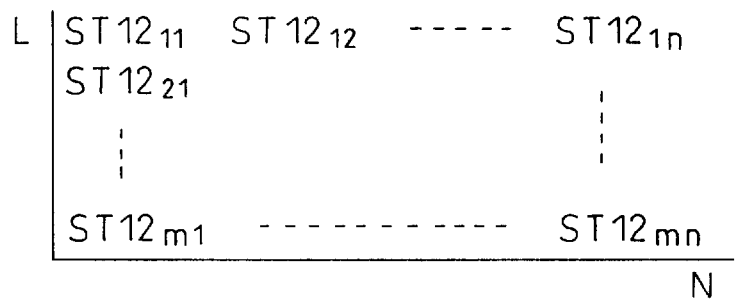
FIGS. 16A to 16D are views of a map of a target opening degree of a throttle valve.
Figure 17A:
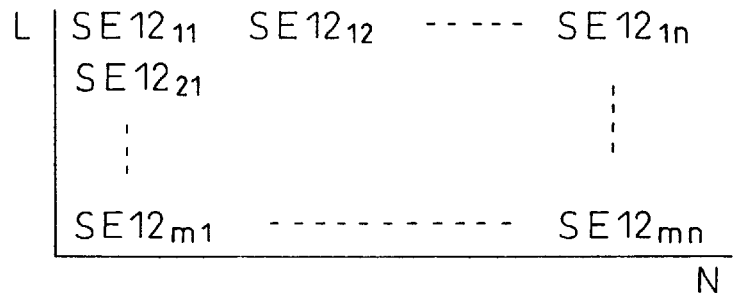
FIGS. 17A to 17D are views of a map of a target basic opening degree of an EGR control valve.

That is, FIG. 16A shows the target opening degree ST12 of the throttle valve 16 when the air-fuel ratio is 12, while FIG. 17A shows the target basic opening degree SE12 of the EGR control valve 23 when the air-fuel ratio is 12.

Figure 16B:
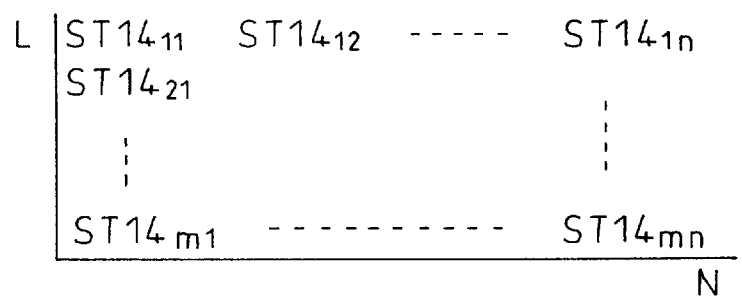
Figure 17B:
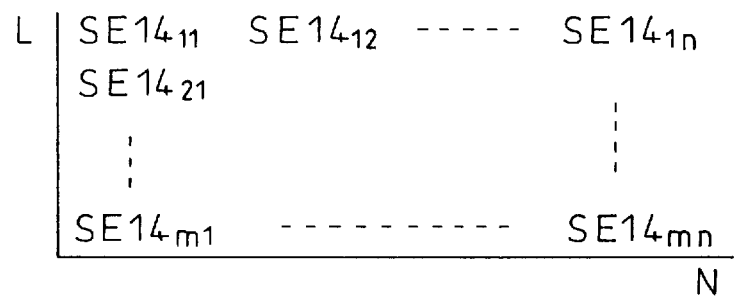

Further, FIG. 16B shows the target opening degree ST14 of the throttle valve 16 when the air-fuel ratio is 14, while FIG. 17B shows the target basic opening degree SE14 of the EGR control valve 23 when the air-fuel ratio is 14.

Figure 16C:
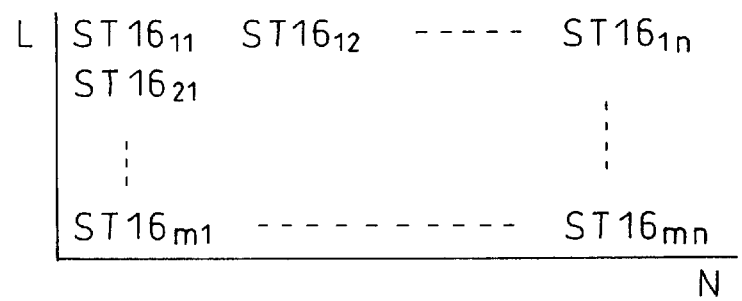
Figure 17C:
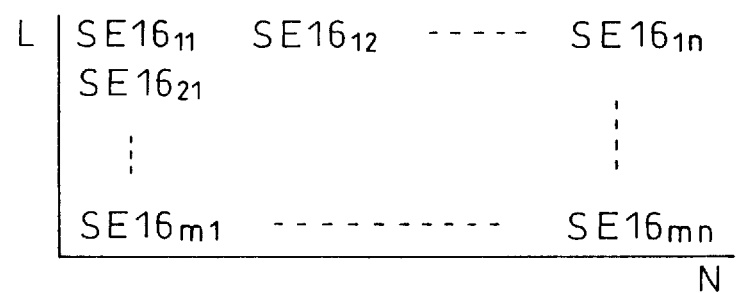

Further, FIG. 16C shows the target opening degree ST16 of the throttle valve 16 when the air-fuel ratio is 16, while FIG. 17C shows the target basic opening degree SE16 of the EGR control valve 23 when the air-fuel ratio is 16.

Figure 16D:
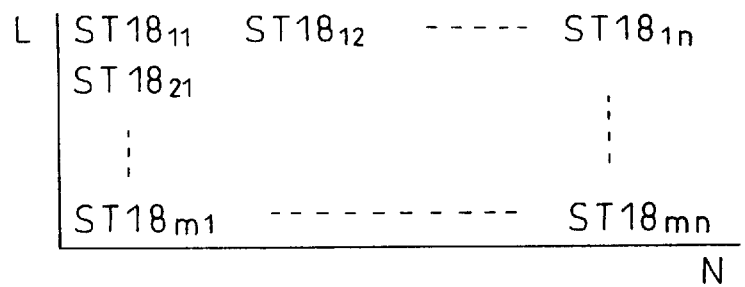
Figure 17D:
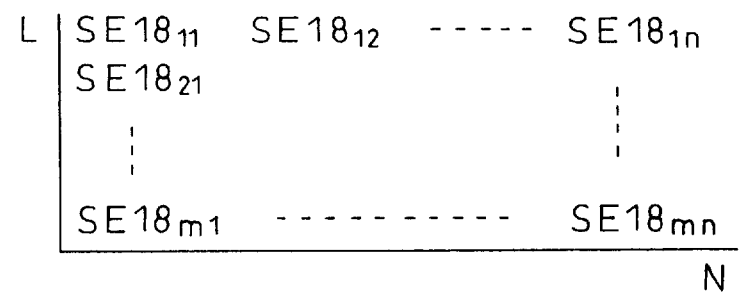

Further, FIG. 16D shows the target opening degree ST18 of the throttle valve 16 when the air-fuel ratio is 18, while FIG. 17D shows the target basic opening degree SE18 of the EGR control valve 23 when the air-fuel ratio is 18.

Figure 18:
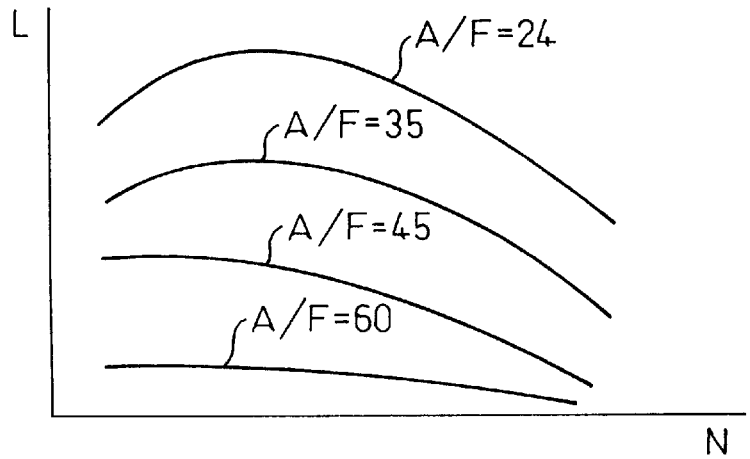
FIG. 18 is a view of an air-fuel ratio in a second combustion etc.
Figure 19A:
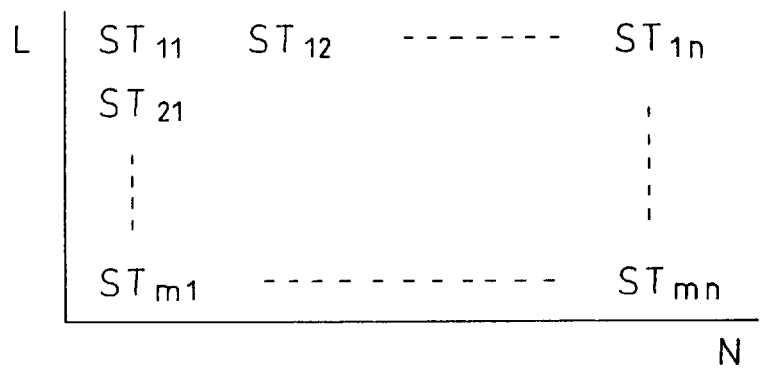
FIGS. 19A and 19B are views of a target opening degree of a throttle valve etc.
Figure 19B:
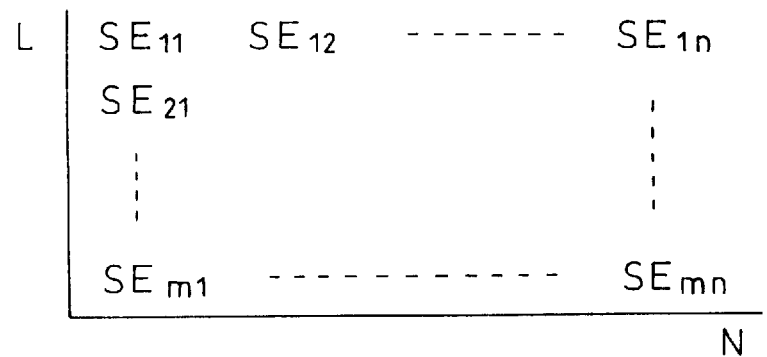

FIG. 18 shows the target air-fuel ratio at the time of second combustion, that is, normal combustion by the conventional combustion method. Note that in FIG. 18, the curves indicated by A/F=24, A/F=35, A/F=45, and A/F=60 respectively show the target air-fuel ratios 24, 35, 45, and 60. The target opening degrees ST of the throttle valve 16 required for making the air-fuel ratio these target air-fuel ratios are stored in advance in the ROM 32 in the form of a map as a function of the required load L and the engine rotational speed N as shown in FIG. 19A. The target opening degrees SE of the EGR control valve 23 required for making the air-fuel ratio these target air-fuel ratios are stored in advance in the ROM 32 in the form of a map as a function of the required load L and the engine rotational speed N as shown in FIG. 19B.

When the engine is operating in the second operating state, the air-fuel ratio is made the target air-fuel ratio shown in FIG. 18. Further, when the engine is operating in the boundary region Z and the second combustion should be performed, the air-fuel ratio is made the target air-fuel ratio shown in FIG. 18.

Figure 20:
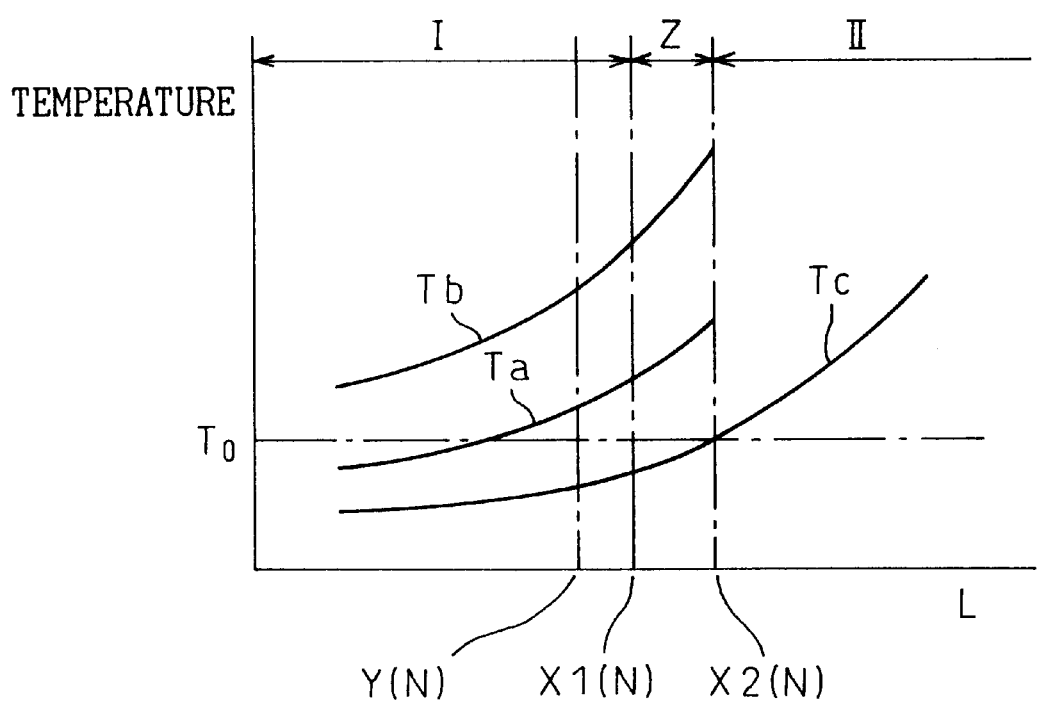
FIG. 20 is a view of a temperature Ta of exhaust gas flowing into a catalyst and temperatures Tb and Tc of the catalyst bed.

FIG. 20 shows the relationship between various temperatures and the required load L. Note that in FIG. 20, $T_0$ shows the temperature where the catalyst 19 becomes activated. The temperature at which the catalyst 19 becomes activated differs according to the type of the catalyst 19, but the activation temperature of a typical catalyst having an oxidation function is about 350° C.

In FIG. 20, Ta shows the temperature of the exhaust gas flowing into the catalyst 19 when the first combustion, that is, when low temperature combustion, is being performed in the first operating region I and the boundary region Z, while Tb shows the temperature of the catalyst bed of the catalyst 19 at that time. Further, Tc shows the temperature of the catalyst bed of the catalyst 19 when the second combustion is being performed in the first operating region I, boundary region Z, and second operating region II.

Even when low temperature combustion is being performed, the higher the required load L, the larger the amount of heat generated at the time of combustion, so the higher the required load L, the higher the temperature Ta of the exhaust gas flowing into the catalyst 19. On the other hand, at the time of low temperature combustion, large amounts of unburned HC and CO are exhausted from the engine, so the temperature Tb of the catalyst bed of the catalyst 19 becomes considerably higher compared with the temperature Ta of the exhaust gas flowing into the catalyst 19 due to the heat of oxidation reaction of the unburned HC and CO. As shown by FIG. 20, when the required load L is low, the temperature Ta of the exhaust gas flowing into the catalyst 19 becomes lower than the activation temperature $T_0$ of the catalyst 19, but when the temperature Ta of the inflowing exhaust gas is not that low compared with the activation temperature To, the unburned HC and CO are subjected to an oxidation action at the catalyst 19, therefore at this time the temperature Tb of the catalyst bed becomes higher than the activation temperature $T_0$. That is, when low temperature combustion is being performed, the temperature Tb of the catalyst bed becomes higher than the activation temperature To regardless of the required load L, therefore the unburned HC and CO are oxidized well by the catalyst 19.

On the other hand, even when the second combustion is being performed, the higher the required load L becomes, the greater the amount of the heat generated at the time of combustion, so the higher the required load L, the higher the temperature Tc of the catalyst bed. As shown by FIG. 20, when the engine is operating in the second operating region II, the temperature Tc of the catalyst bed becomes higher than the activation temperature $T_0$ regardless of the required load L.

As explained above, however, the temperature of the exhaust gas at the time of second combustion is lower than the temperature of the exhaust gas at the time of the first combustion, therefore when second combustion is performed successively in the boundary region Z or the first combustion region I, as shown by FIG. 20, the temperature Tc of the catalyst bed ends up becoming considerably lower than the activation temperature $T_0$. If the second combustion is continued in such a state, it is not possible to oxidize the unburned HC and CO in the catalyst 19 and therefore unburned HC and CO are released into the atmosphere.

Therefore, in the present invention, when the second combustion is being performed, when the temperature Tc of the catalyst bed is about to become less than the activation temperature $T_0$, the first combustion is switched to. In this embodiment of the present invention, even when the required load L becomes the low load side of the third boundary X2(N), when the required load L is larger than the second boundary Y(N), ordinary second combustion is performed. At this time, when the temperature Tc of the catalyst bed is about to become lower than the activation temperature $T_0$, the second combustion is switched to the first combustion.

Next, the first embodiment will be explained with reference to FIG. 21 to FIG. 28.

Figure 21:
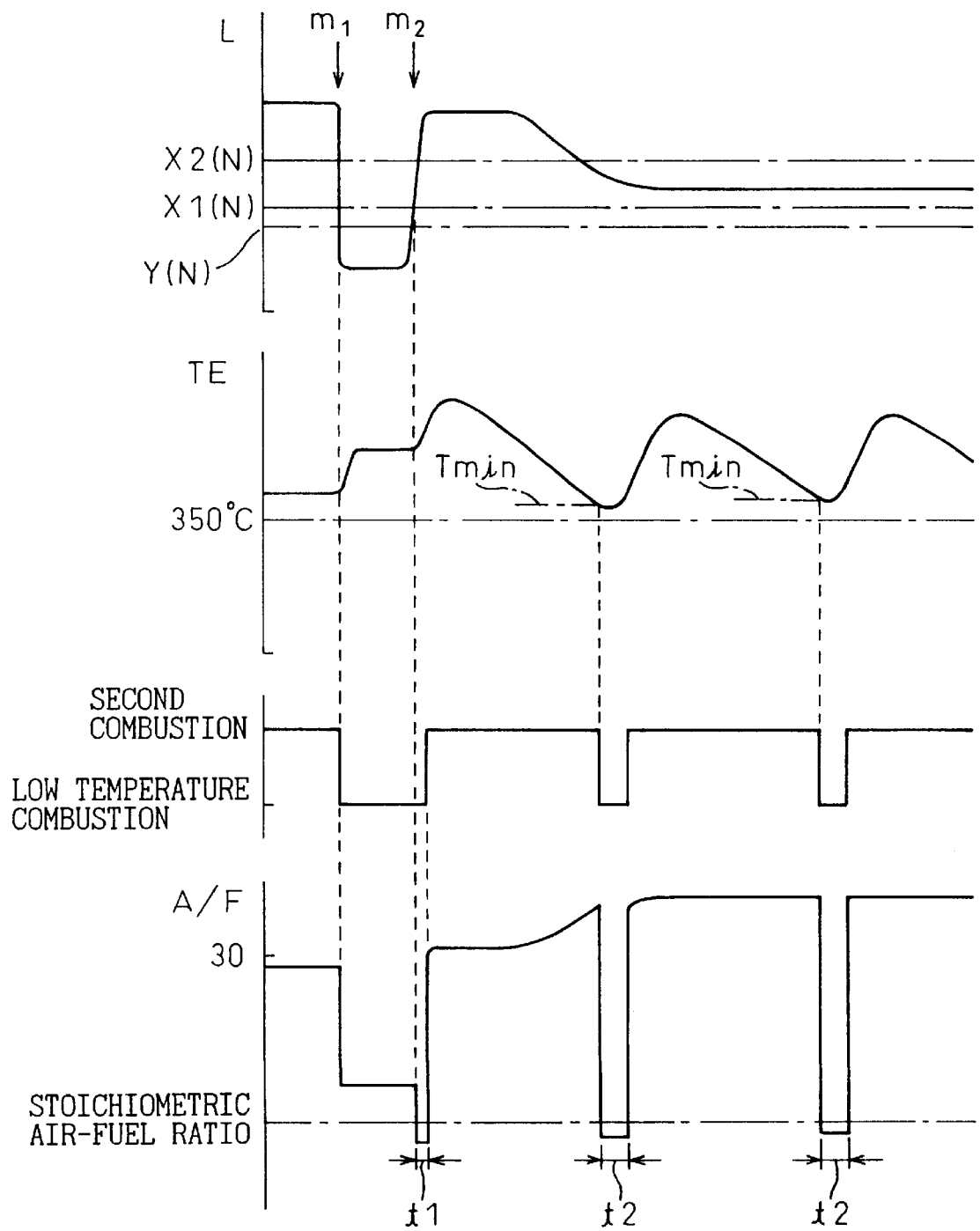
FIG. 21 is a view for explaining the switching between low temperature combustion and second combustion.

First, an explanation will be made of the method of control of the temperature of the catalyst bed of the catalyst 19 to at least the activation temperature with reference to FIG. 21. FIG. 21 shows the relationship among the required load L, the temperature TE of the exhaust gas flowing out from the catalyst 19, and the air-fuel ratio A/F in the combustion chamber 5.

In FIG. 21, at the time $m_1$, when the required load L changes from L>X2(N) to L<Y(N), the second combustion is switched to the first combustion. When the second combustion is switched to the first combustion, the temperature of the catalyst bed rises due to the oxidation action of the large amounts of exhausted unburned HC and CO, therefore the temperature TE of the exhaust gas rises. Next, when the required load L exceeds the first boundary X1(N), the temperature of the catalyst bed is raised by making the air-fuel ratio A/F rich for exactly a predetermined time t1 under first combustion and then switching to second combustion.

That is, when the first combustion is being performed, if the air-fuel ratio A/F is made rich temporarily, the unburned HC and CO are adsorbed at the catalyst 19. When the second combustion is next switched to, the unburned HC and CO adsorbed in the catalyst 19 are immediately oxidized by the excess oxygen contained in the exhaust gas, therefore as shown by FIG. 21, the temperature TE of the exhaust gas, that is, the temperature of the catalyst bed, rapidly rises.

Figure 23:
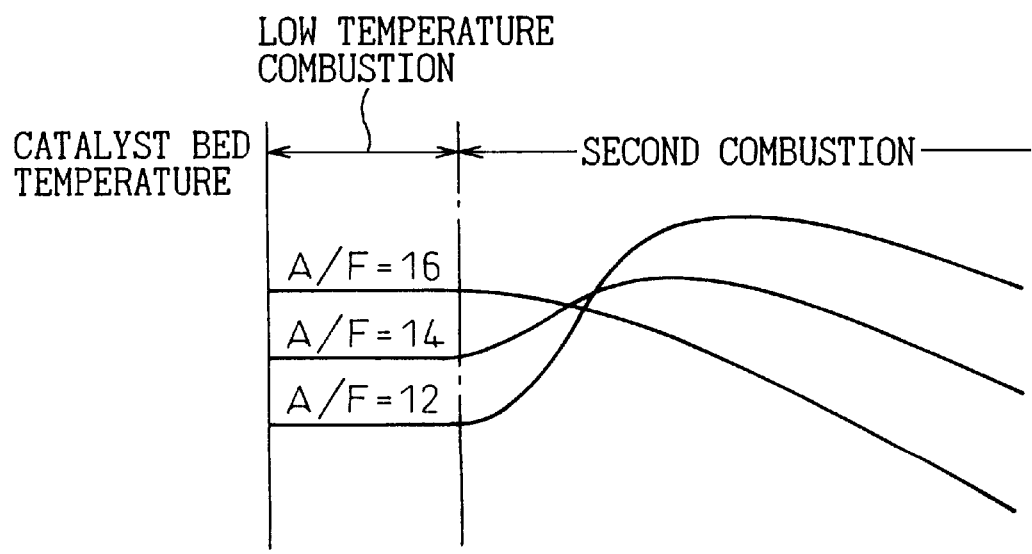
FIG. 23 is a view of a change in the temperature of the catalyst bed.
Figure 24:
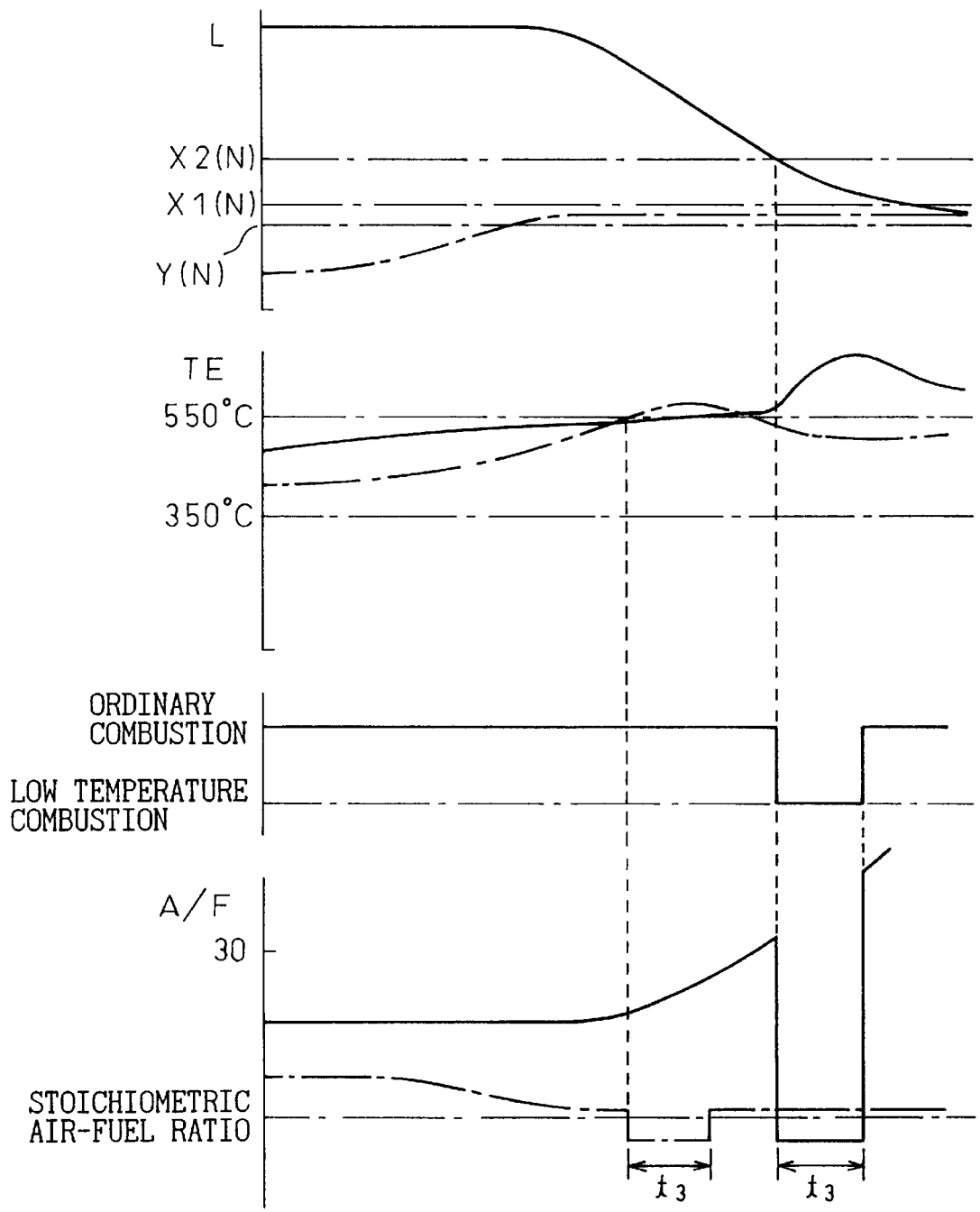
FIG. 24 is a view for explaining the processing for disassociation of SOx from the catalyst.

FIG. 23 shows an embodiment showing the change in the temperature of the catalyst bed when low temperature combustion is switched to second combustion. As shown in FIG. 23, if second combustion is switched to when low temperature combustion is being performed by a lean air-fuel ratio (A/F=16), the temperature of the catalyst bed gradually becomes lower. As opposed to this, if second combustion is switched to when low temperature combustion is being performed by a rich air-fuel ratio (A/F=14 or A/F=12), the unburned HC and CO adsorbed in the catalyst are oxidized by the excess oxidation, so the temperature of the catalyst bed rises. The higher the degree of richness when low temperature combustion is being performed in this case, the larger the amount of rise of the temperature of the catalyst bed.

Returning again to FIG. 21, assume that at the time $m_2$, the low temperature combustion is switched to second combustion, then a little while after the required load L is held between the second boundary Y(N) and the third boundary X2(N) and second combustion is continued. In this case, the temperature TE of the exhaust gas, that is, the temperature of the catalyst bed, gradually falls along with the elapse of time. Next, when the temperature TE of the exhaust gas falls to a predetermined minimum allowable temperature Tmin, the second combustion is switched to the low temperature combustion for exactly a predetermined time t2. At this time, since the engine is operating in the boundary region Z, so the air-fuel ratio A/F becomes rich. If the second combustion is switched to low temperature combustion in this way, the temperature TE of the exhaust gas, that is, the temperature of the catalyst bed, rises.

If the temperature TE of the exhaust gas again falls to the predetermined minimum allowable temperature Tmin after a while, the second combustion is again switched to the low temperature combustion for exactly the predetermined time t2, therefore the temperature TE of the exhaust gas, that is, the temperature of the catalyst bed, again rises. In this way, the temperature of the catalyst bed is maintained at least at the activation temperature.

Figure 22:
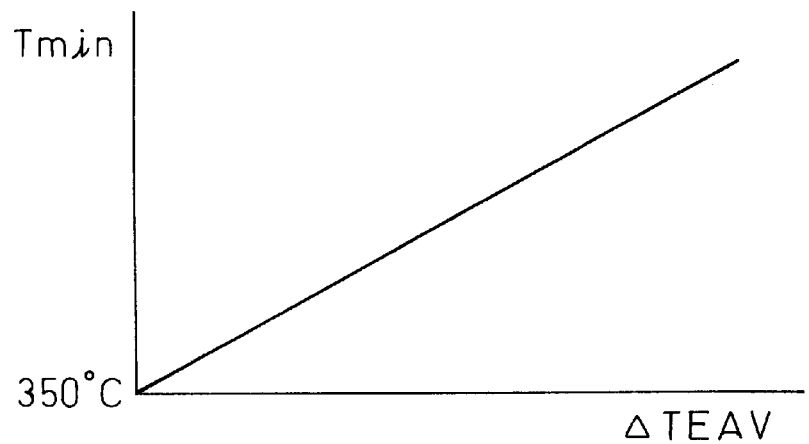
FIG. 22 is a view of a minimum allowable temperature Tmin.

The predetermined minimum allowable temperature Tmin shown in FIG. 21 is a function of the average rate of decline ΔTEAV of the temperature TE of the exhaust gas. As shown in FIG. 22, the minimum allowable temperature becomes larger the larger the average rate of decline ΔTEAV of the temperature TE of the exhaust gas. That is, where the rate of decline of the temperature TE of the exhaust gas is high, if the second combustion is switched to low temperature combustion when the temperature TE of the exhaust gas becomes low, the temperature of the catalyst bed will end up falling to below the activation temperature. Therefore, to ensure that the temperature of the catalyst bed does not fall below the activation temperature, the minimum allowable temperature Tmin is made higher the larger the average rate of decline ΔTEAV of the temperature TE of the exhaust gas.

On the other hand, SOx is included in the exhaust gas. This SOx is adsorbed in the catalyst 19. Along with the elapse of time, the amount of SOx adsorbed in the catalyst 19 gradually increases. The SOx adsorbed in the catalyst 19 disassociates from the catalyst 19 in the form of $SO_2$ when the temperature of the catalyst bed exceeds a predetermined temperature, for example, 600° C. If the air-fuel ratio is lean at this time, the $SO_2$ is oxidized by the excess oxygen and becomes $SO_3^-$, then becomes $H_2SO_4$, so white smoke is produced. As opposed to this, when the air-fuel ratio is rich, the $SO_2$ is not oxidized and is exhausted to the atmosphere in the form of $SO_2$, therefore white smoke is no longer produced in this case.

Therefore, in this embodiment of the present invention, when the amount of SOx adsorbed in the catalyst 19 exceeds a predetermined amount, that is, when there is a possibility of production of a large amount of white smoke, the air-fuel ratio A/F is made rich when the temperature TE of the exhaust gas exceeds a predetermined temperature, for example, 550° C. That is, as shown by the solid line in FIG. 24, if TE becomes greater than 550° C. and L becomes smaller than X2(N) when second combustion is being performed, low temperature combustion is performed and the air-fuel ratio A/F is made rich. As shown by the broken line in FIG. 24, if TE becomes greater than 550° C. when low temperature combustion is being performed, the air-fuel ratio A/F is made rich for exactly a predetermined time t3. As a result, the $SO_2$ disassociated from the catalyst 19 is released as it is into the atmosphere.

Figure 25:
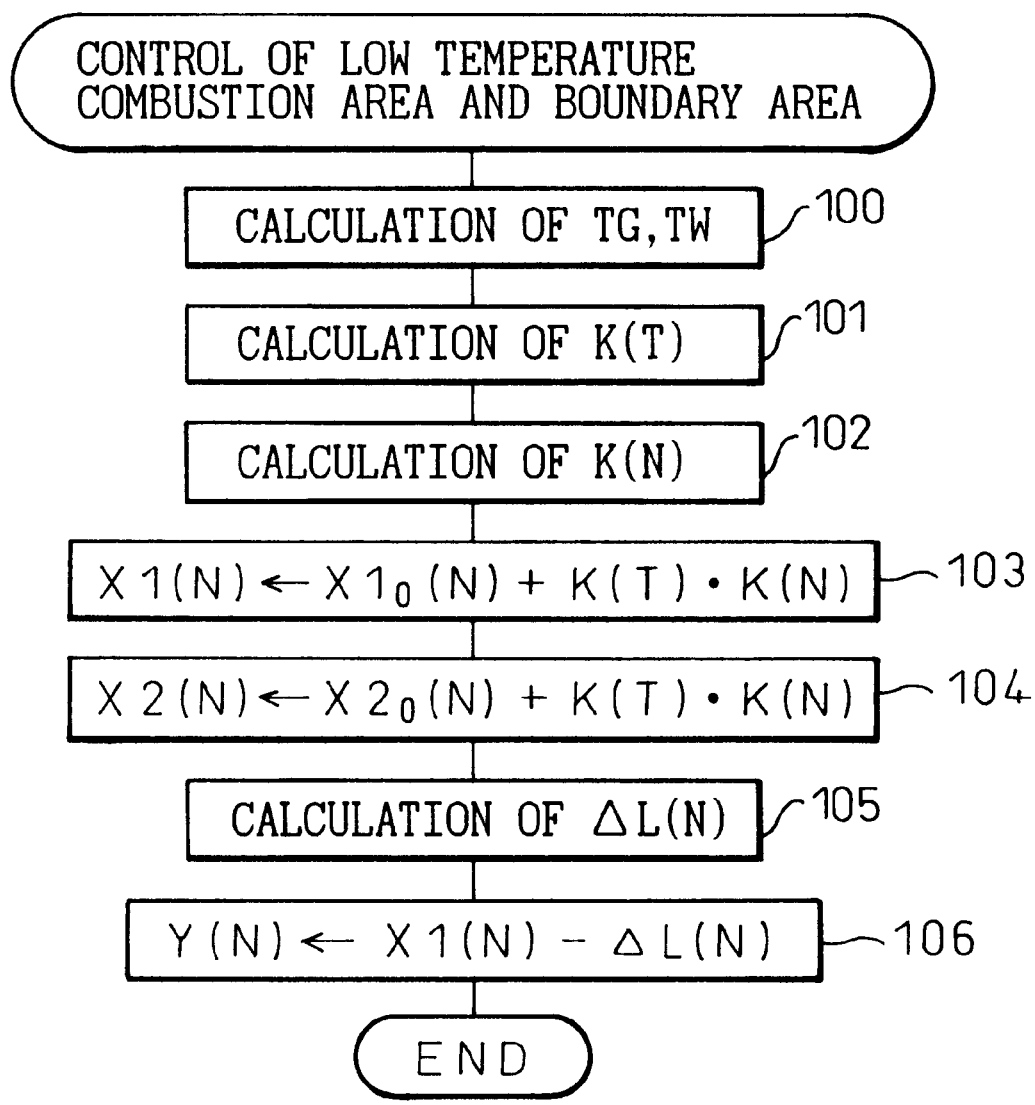
FIG. 25 is a flow chart of the control of a low temperature combustion region and boundary region.

FIG. 25 shows the routine for control of the low temperature combustion region, that is, the first operating region I and the boundary region Z.

Referring to FIG. 25, first, at step 100, the temperature of the gas TG inside the combustion chamber 5 at the start of compression and the temperature TW of the cylinder inner wall are calculated. In this embodiment, the temperature of the mixed gas of the suction air and the EGR gas detected by the temperature sensor 44 is made the temperature of the gas TG in the combustion chamber 5 at the start of compression, while the temperature of the engine cooling water detected by the temperature detector 29 is made the temperature TW of the cylinder inner wall. Next, at step 101, $K(T)_1$ is found from the relationship shown in FIG. 13A, $K(T)_2$ is found from the relationship shown in FIG. 13B, and these $K(T)_1$ and $K(T)_2$ are added to calculate $K(T)(=K(T)_1+K(T)_2)$.

Next, at step 102, K(N) is calculated from the relationship shown in FIG. 13C based on the engine rotational speed N. Next, at step 103, the value of the first boundary $X1_0(N)$ stored in advance is used to calculate the value of the first boundary X1(N) based on the following equation:

$$X1(N)=X1_0(N)+K(T) \cdot K(N)$$

Next, at step 104, the value of the third boundary $X2_0(N)$ stored in advance is used to calculate the value of the third boundary X2(N) based on the following equation:

$$X2(N)=X2_0(N)+K(T) \cdot K(N)$$

Next, at step 105, AL(N) is calculated from the relationship shown in FIG. 9 based on the engine rotational speed N. Next, at step 106, ΔL(N) is subtracted from X1(N) to calculate the value of the second boundary Y(N)(=X1(N)−ΔL(N)).

Next, an explanation will be given of the control of the operation with reference to FIG. 26 and FIG. 27.

Figure 26:
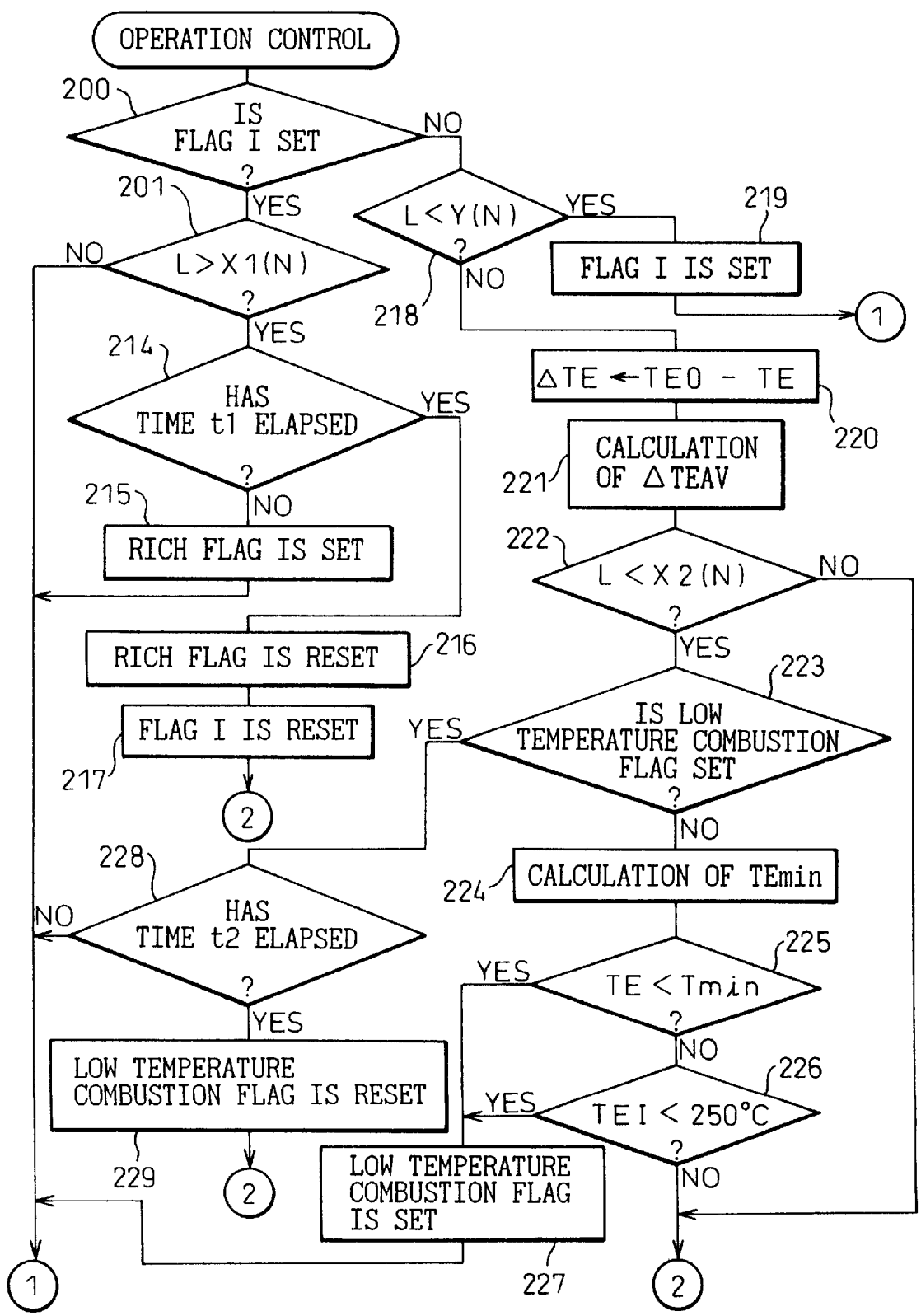
FIGS. 26 and 27 are flow charts of the control of engine operation.
Figure 27:
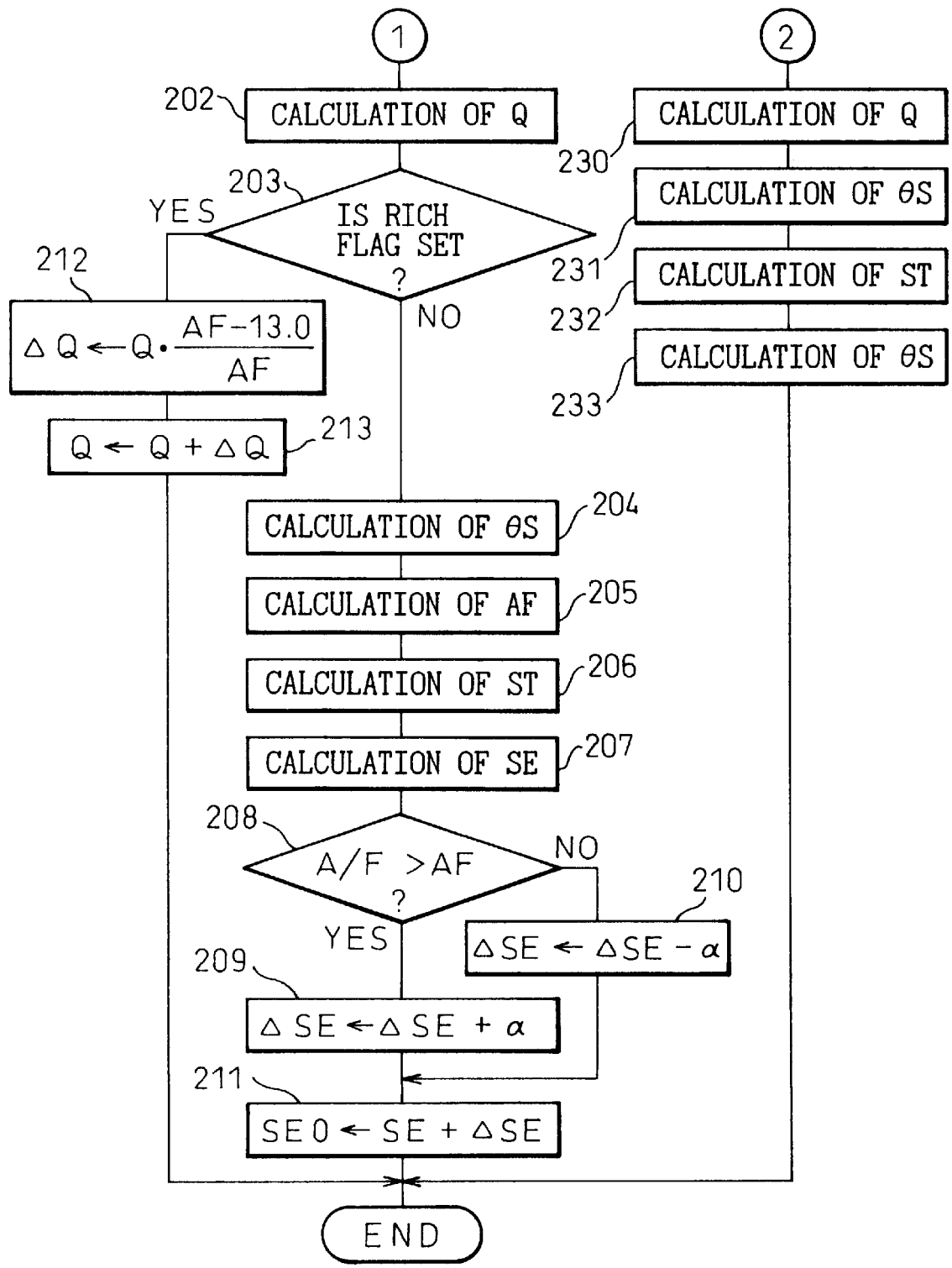

Referring to FIG. 26 and 27, first, at step 200, it is judged if the flag I shown that the engine operating condition is the first operating region I has been set or not. When the flag I has been set, that is, when the engine operating state is the first operating region I, the routine proceeds to step 201, where it is judged if the required load L has become larger than the first boundary X1(N) or not. When L≦X1(N), the routine proceeds to step 202, where low temperature combustion is performed.

That is, at step 202, the amount of injected fuel Q is calculated, then at step 203, it is judged if the rich flag which was set when switching from the low temperature combustion to the second combustion has been set or not. When the rich flag has not been set, the routine proceeds to step 204, where the injection start timing θS is calculated, then the routine proceeds to step 205.

At step 205, the target air-fuel ratio AF is calculated by proportional distribution using two maps in accordance with K(T) among the maps shown from FIGS. 15A to 15D. Next, at step 206, the target opening degree ST of the throttle valve 16 is calculated by proportional distribution using two maps in accordance with the target air-fuel ratio AF among the maps shown from FIGS. 16A to 16D. The opening degree of the throttle valve 16 is controlled to this target opening degree ST. Next, at step 207, the target basic opening degree SE of the EGR control valve 23 is calculated by proportional distribution using two maps in accordance with the target air-fuel ratio AF among the maps shown from FIGS. 17A to 17D. Next, the routine proceeds to step 208.

At step 208, it is judged if the actual air-fuel ratio A/F detected by the air-fuel ratio sensor 21 is larger than the target air-fuel ratio AF or not. When A/F>AF, the routine proceeds to step 209, where the predetermined value α is added to the correction value ASE for the opening degree of the EGR control valve 23, then the routine proceeds to step 211. As opposed to this, when A/F≦AF, the routine proceeds to step 210, where the predetermined value α is subtracted from the correction value ASE, then the routine proceeds to step 211. At step 211, the correction value ASE is added to the target basic opening degree SE of the EGR control valve 23 to calculate the target opening degree SE0 of the EGR control valve 23. The opening degree of the EGR control valve 23 is controlled to this target opening degree SE0. That is, in this embodiment, by controlling the opening degree of the EGR control valve 23, the actual air-fuel ratio is controlled to the target air-fuel ratio AF. Of course, in this case, it is also possible to control the actual air-fuel ratio to the target air-fuel ratio AF by controlling the opening degree of the throttle valve 16.

On the other hand, when it is judged at step 201 that L>X1(N), the routine proceeds to step 214, where it is judged if a predetermined time t1 has elapsed from when L became greater than X1(N). When the predetermined time t1 has not elapsed from when L became greater than X1(N), the routine proceeds to step 215, where the rich flag is set. When the rich flag is set, the routine proceeds from step 203 to step 212, where the target air-fuel ratio AF calculated in the previous processing cycle is used to calculate the correction valve $\Delta Q$ of the amount of injected fuel required for making the air-fuel ratio A/F rich, for example, 13, based on the following equation:

$$\Delta Q = Q \cdot (AF - 13.0)/A/F$$

Next, at step 213, the correction value $\Delta Q$ is added to the amount of injected fuel Q to calculate the final amount of injected fuel $Q(=Q+\Delta Q)$.

Next, when the predetermined time t1 has elapsed from when L became greater than X1(N), the routine proceeds from step 214 to step 216, where the rich flag is reset, then the routine proceeds to step 217, where the flag I is reset. Next, the routine proceeds to step 230, where second combustion is performed. That is, at step 230, the amount of injected fuel Q is calculated, at step 231, the injection start time θS is calculated, at step 232, the target opening degree ST of the throttle valve 16 is calculated from the map shown in FIG. 19A, then at step 233, the target opening degree SE of the EGR control valve 23 is calculated from the map shown in FIG. 19B.

Therefore, when L becomes greater than X1(N) when low temperature combustion is being performed, the air-fuel ratio A/F is made rich for exactly the predetermined time t1, then second combustion is switched to.

When the flag I is set, the routine proceeds from step 200 to step 218, where it is judged if L has become smaller than Y(N). When L≦Y(N), the routine proceeds to step 220, the temperature difference $\Delta TE(=TEO-TE)$ between the temperature TEO of the exhaust gas downstream of the catalyst 19 detected at the previous processing cycle based on the output signal of the temperature sensor 46 and the current temperature TE of the exhaust gas downstream of the catalyst 19 is calculated. Next, at step 221, the average rate of decline $\Delta TEAV$ of the temperature TE of the exhaust gas, which is the average of the latest temperature difference $\Delta TE$ in a predetermined time period, is calculated. Next, at step 222, it is judged if L<X2(N), that is, if the engine is operating in the boundary region Z. When L≧X2(N), that is, when the engine is operating in the second operating region II, the routine jumps to step 230, where second combustion is performed.

As opposed to this, when L<X2(N), that is, when the engine is operating in the boundary region Z, the routine proceeds to step 223, where it is judged if the low temperature combustion flag showing that low temperature combustion should be performed has been set. When the low temperature combustion flag has been reset, the routine proceeds to step 224, where the minimum allowable temperature Tmin is calculated from the average rate of decline $\Delta TEAV$ of the temperature TE of the exhaust gas based on the relationship shown in FIG. 22.

Next, at step 225, it is judged if the temperature TE of the exhaust gas downstream of the catalyst 19 has become lower than the minimum allowable temperature Tmin or not. When TE≧Tmin, the routine proceeds to step 226, where it is judged if the temperature TEI of the exhaust gas upstream of the catalyst 19 detected by the temperature sensor 45 is higher than the predetermined minimum allowable temperature, for example, 250° C. When TEI≧250° C., the routine proceeds to step 230, where the second combustion is performed.

On the other hand, when it is judged at step 225 that TE<Tmin, the routine proceeds to step 227, where the low temperature combustion flag is set. Next, the routine proceeds to step 202, where low temperature combustion is switched to. When the low temperature combustion flag is set, at the next processing cycle, it is judged at step 223 that the low temperature combustion flag has been set, so the routine proceeds to step 228, where it is judged if a predetermined time t2 has elapsed from when the low temperature combustion flag has been set. When the predetermined time t2 has not elapsed from when the low temperature combustion flag has been set, the routine proceeds to step 202, where low temperature combustion is continued. When the predetermined time t2 has elapsed from when the low temperature combustion flag has been set, the routine proceeds to step 229, where the low temperature combustion flag is reset, then the routine proceeds to step 230. Therefore, if TE<Tmin, the second combustion is switched to low temperature combustion for exactly the predetermined time t2.

On the other hand, even when it is judged at step 225 that TE≧Tmin, if it is judged at step 226 that TEI<250° C., the routine proceeds to step 227, where the low temperature combustion flag is set and low temperature combustion is switched to. That is, even when TE≧Tmin, if the temperature TEI of the exhaust gas flowing into the catalyst 19 becomes too low, there-is a possibility that the catalyst 19 will become deactivated. Therefore, even when TE≧Tmin, when TEI<250° C., the second combustion is switched to low temperature combustion.

On the other hand, when it is judged at step 218 that L<Y(N), the routine proceeds to step 219, where the flag I is set. Next, the routine proceeds to step 202, where low temperature combustion is switched to.

Figure 28:
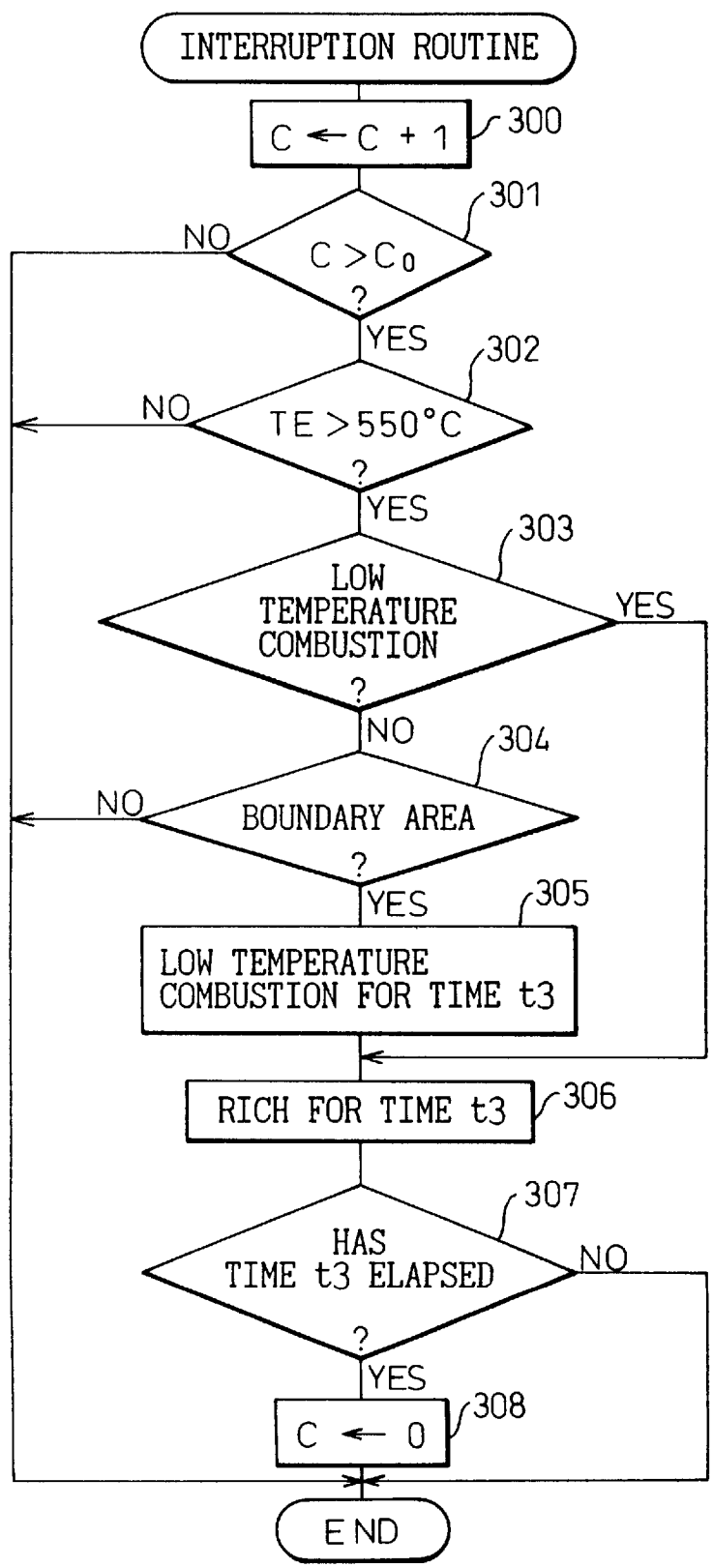
FIG. 28 is a view of a time interruption routine.

FIG. 28 shows the routine for time interruption for treating the $SO_2$ disassociated from the catalyst.

Referring to FIG. 28, first, at step 300, the count C is incremented by 1. The count C shows the cumulative operating time of the vehicle. This count C is stored in the backup RAM 33a. Next, at step 301, it is judged if the count C has exceeded the predetermined value $C_0$ or not, that is, if the cumulative operating time of the vehicle has exceeded the predetermined time. When $C>C_0$, the routine proceeds to step 302, where it is judged if the temperature TE of the exhaust gas downstream of the catalyst 19 is higher than for example 550° C. When TE>550° C., the routine proceeds to step 303, where it is judged if low temperature combustion is being performed or not. When low temperature combustion is being performed, the routine proceeds to step 306, where the air-fuel ratio A/F is made rich for exactly the predetermined time t3.

On the other hand, when low temperature combustion is not being performed, the routine proceeds to step 304, it is judged if the engine is operating in the boundary region Z, that is, if second combustion is being performed in the boundary region Z. When second combustion is being performed in the boundary region Z, the routine proceeds to step 305, where low temperature combustion is switched to for exactly a predetermined time t3. Next, at step 306, the air-fuel ratio A/F is made rich. Next, at step 307, it is judged if the time t3 has elapsed or not. When the time t3 has elapsed, the routine proceeds to step 308, where the count C is made zero.

By making the air-fuel ratio rich when TE>550° C. in this way, it is possible to release the $SO_2$ disassociated from the catalyst 19 in that form into the atmosphere and therefore possible to prevent a large amount of white smoke from being released into the atmosphere.

Figure 29:
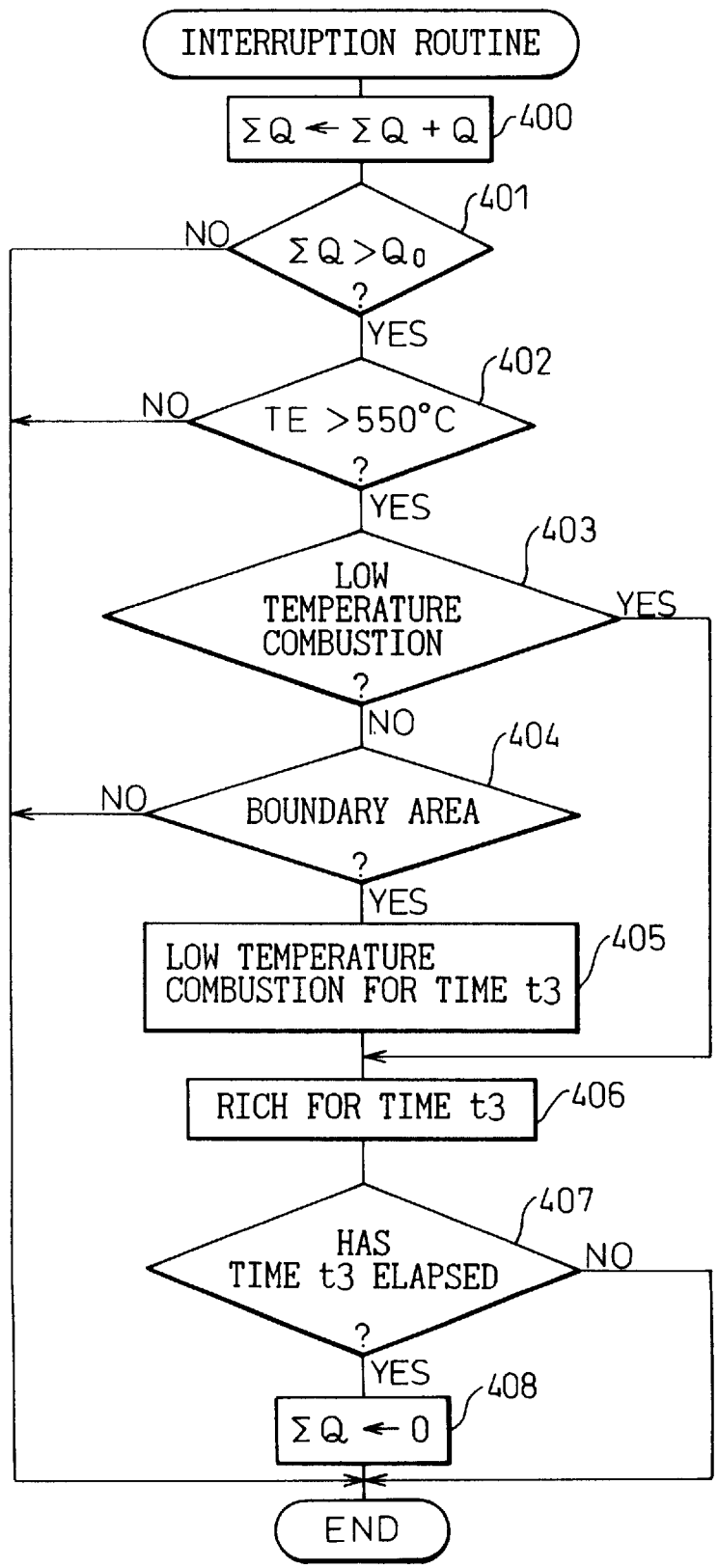
FIG. 29 is a view of a crank angle interruption routine.

FIG. 29 shows a routine for crank angle interruption showing another embodiment for treating the $SO_2$ disassociated from the catalyst.

Referring to FIG. 29, first, at step 400, the amount of the injected fuel Q is added to $\Sigma Q$. This $\Sigma Q$ shows the cumulative amount of injection. This cumulative amount of injection $\Sigma Q$ is stored in the backup RAM 33a. Next, at step 401, it is judged if the cumulative amount of injection $\Sigma Q$ has exceeded the predetermined amount $Q_0$. If $\Sigma Q > Q_0$, the routine proceeds to step 402, where it is judged if temperature TE of the exhaust gas downstream of the catalyst 19 is higher than for example 550° C. When TE>550° C., the routine proceeds to step 403, it is judged if low temperature combustion is being performed. When low temperature combustion is being performed, the routine proceeds to step 406, where the air-fuel ratio A/F is made rich for exactly a predetermined time t3.

On the other hand, when low temperature combustion is not being performed, the routine proceeds to step 404, where it is judged if the engine is operating in the boundary region Z, that is, if second combustion is being performed in the boundary region Z. When second combustion is being performed in the boundary region Z, the routine proceeds to step 405, where low temperature combustion is being switched to for exactly the predetermined time t3. Next, at step 406, the air-fuel ratio A/F is made rich. Next, at step 407, it is judged if the time t3 has elapsed or not. When the time t3 has elapsed, the routine proceeds to step 408, where the cumulative amount of injection $\Sigma Q$ is made zero.

Figure 30:
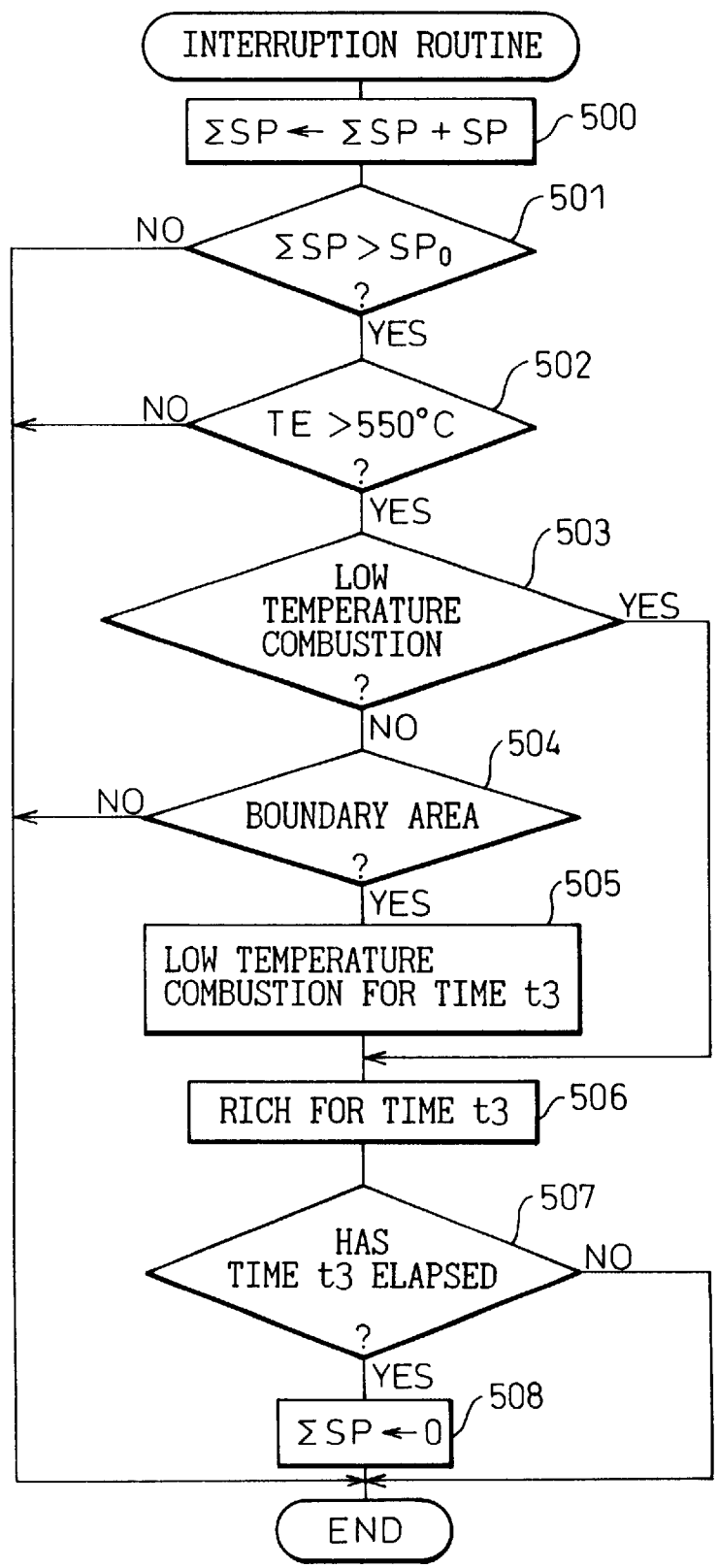
FIG. 30 is a view of a time interruption routine.

FIG. 30 shows a routine for time interruption showing still another embodiment for treating the $SO_2$ disassociated from the catalyst.

Referring to FIG. 30, first, at step 500, the vehicle speed SP detected by the vehicle speed sensor 43 is added to the $\Sigma SP$. Therefore, this $\Sigma SP$ shows the cumulative distance of travel of the vehicle. This cumulative distance of travel $\Sigma SP$ is stored in the backup RAM 33a. Next, at step 501, it is judged if the cumulative distance of travel $\Sigma SP$ of the vehicle has exceeded the predetermined value $SP_0$ or not. When $\Sigma SP > SP_0$, the routine proceeds to step 502, where it is judged if the temperature TE of the exhaust gas downstream of the catalyst 19 is higher than for example 550° C. When TE>550° C., the routine proceeds to step 503, where it is judged if the low temperature combustion is being performed. When low temperature combustion is being performed, the routine proceeds to step 506, where the air-fuel ratio A/F is made rich for exactly the predetermined time t3.

On the other hand, when low temperature combustion is not being performed, the routine proceeds to step 504, where it is judged if the engine is operating in the boundary region Z or not, that is, if second combustion is being performed in the boundary region Z or not. When second combustion is being performed in the boundary region Z, the routine proceeds to step 505, where low temperature combustion is switched to for exactly the predetermined time t3. Next, at step 506, the air-fuel ratio A/F is made rich. Next, at step 507, it is judged if the time t3 has elapsed or not. When the time t3 has elapsed, the routine proceeds to step 508, where the cumulative distance of travel $\Sigma SP$ is made zero.

FIG. 31 to FIG. 34 shows another embodiment. In this embodiment, when the temperature of the catalyst bed of the catalyst 19 falls, second combustion is switched to low temperature combustion. When the temperature of the catalyst bed of the catalyst 19 has become high, the low temperature combustion is switched to the second combustion so as to maintain the temperature of the catalyst bed of the catalyst 19 within a predetermined temperature range.

Figure 31:
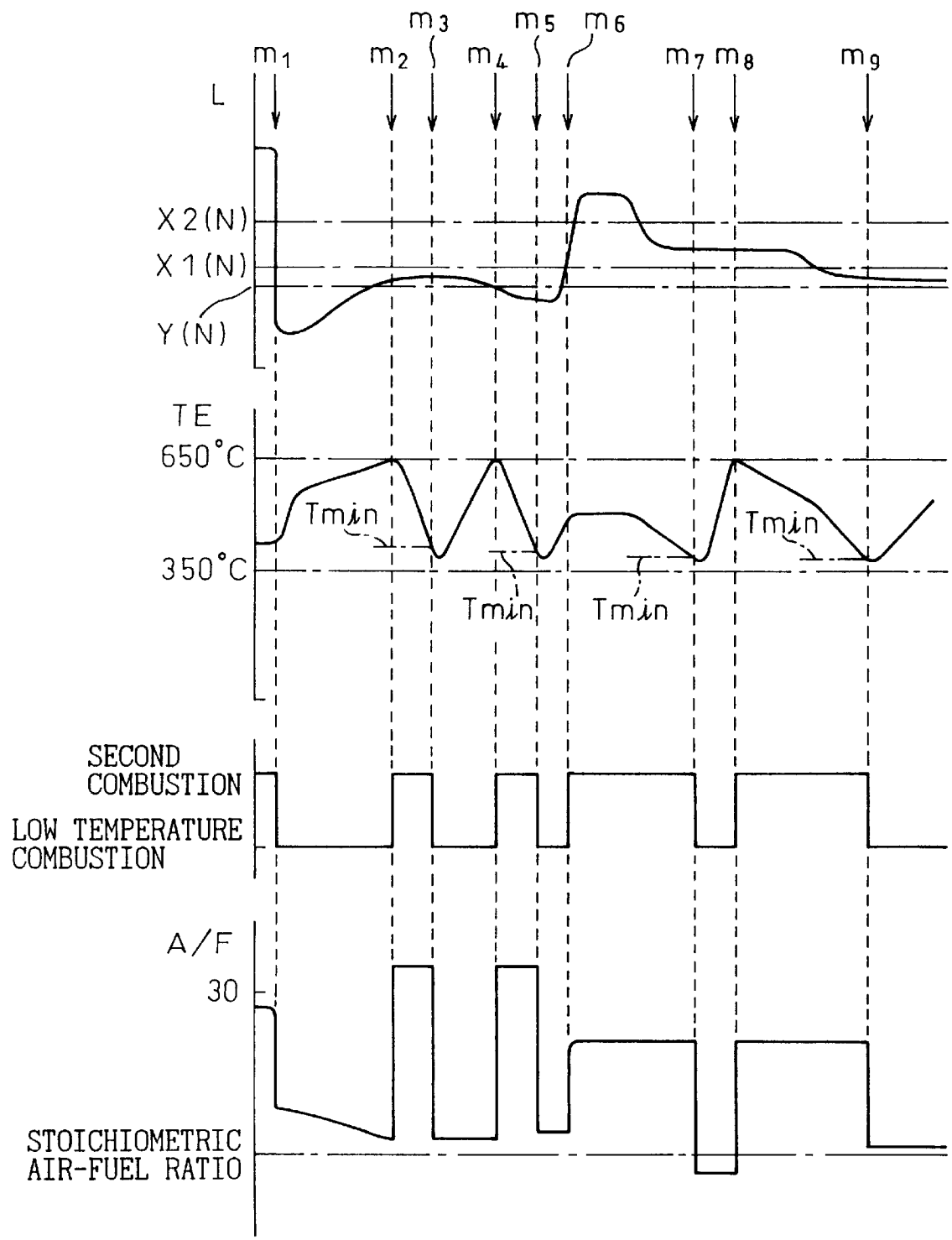
FIG. 31 is a view explaining another embodiment of switching between low temperature combustion and second combustion.

That is, as shown in FIG. 31, when the required load L becomes lower than the second boundary Y(N) at the time m1, second combustion is switched to low temperature combustion. Next, when the temperature TE of the exhaust gas downstream of the catalyst 19 reaches a maximum allowable temperature, for example, 650° C., where there is a possibility of causing deterioration of the catalyst 19 at the time $m_2$, low temperature combustion is switched to second combustion. Next, when the temperature TE of the exhaust gas falls to the minimum allowable temperature Tmin shown in FIG. 22 at the time $m_3$, the second combustion is switched to low temperature combustion. Next, when the temperature TE of the exhaust gas reaches the maximum allowable temperature at the time $m_4$, the second combustion is switched to. Next, when the temperature TE of the exhaust gas falls to the minimum allowable temperature Tmin at the time $m_5$, the low temperature combustion is switched to.

Next, when the required load L exceeds the first boundary X1(N) at the time $m_6$, the second combustion is switched to. Next, when the temperature TE of the exhaust gas falls to the minimum allowable temperature Tmin at the time $m_7$, low temperature combustion is switched to. Next, when the temperature TE of the exhaust gas reaches the maximum allowable temperature at the time $m_{81}$ the second combustion is switched to. Next, when the temperature TE of the exhaust gas falls to the minimum allowable temperature Tmin at step $m_9$, the low temperature combustion is switched to.

Figure 32:
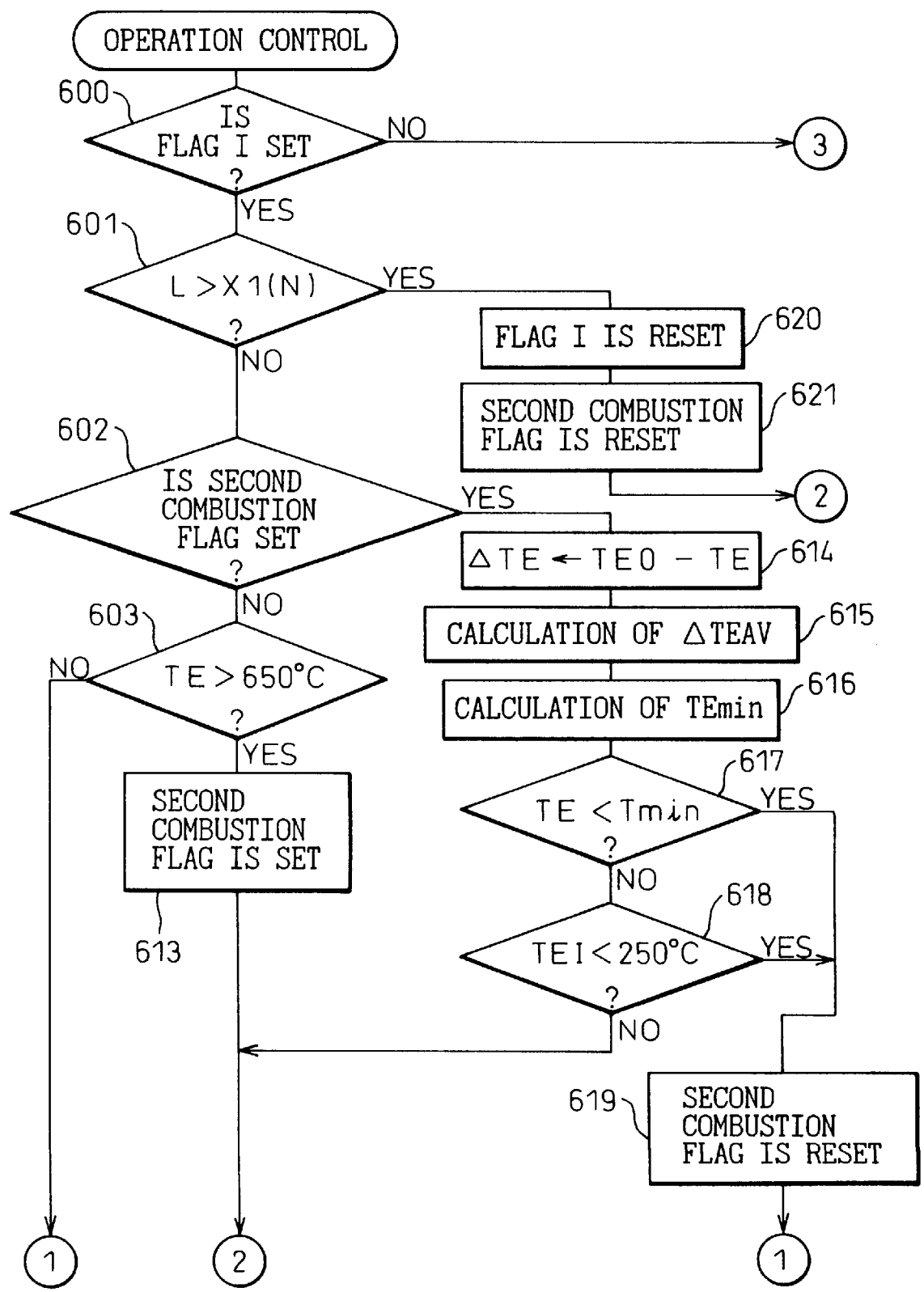
FIGS. 32 to 34 are flow charts of another embodiment for control of the engine operation.
Figure 33:
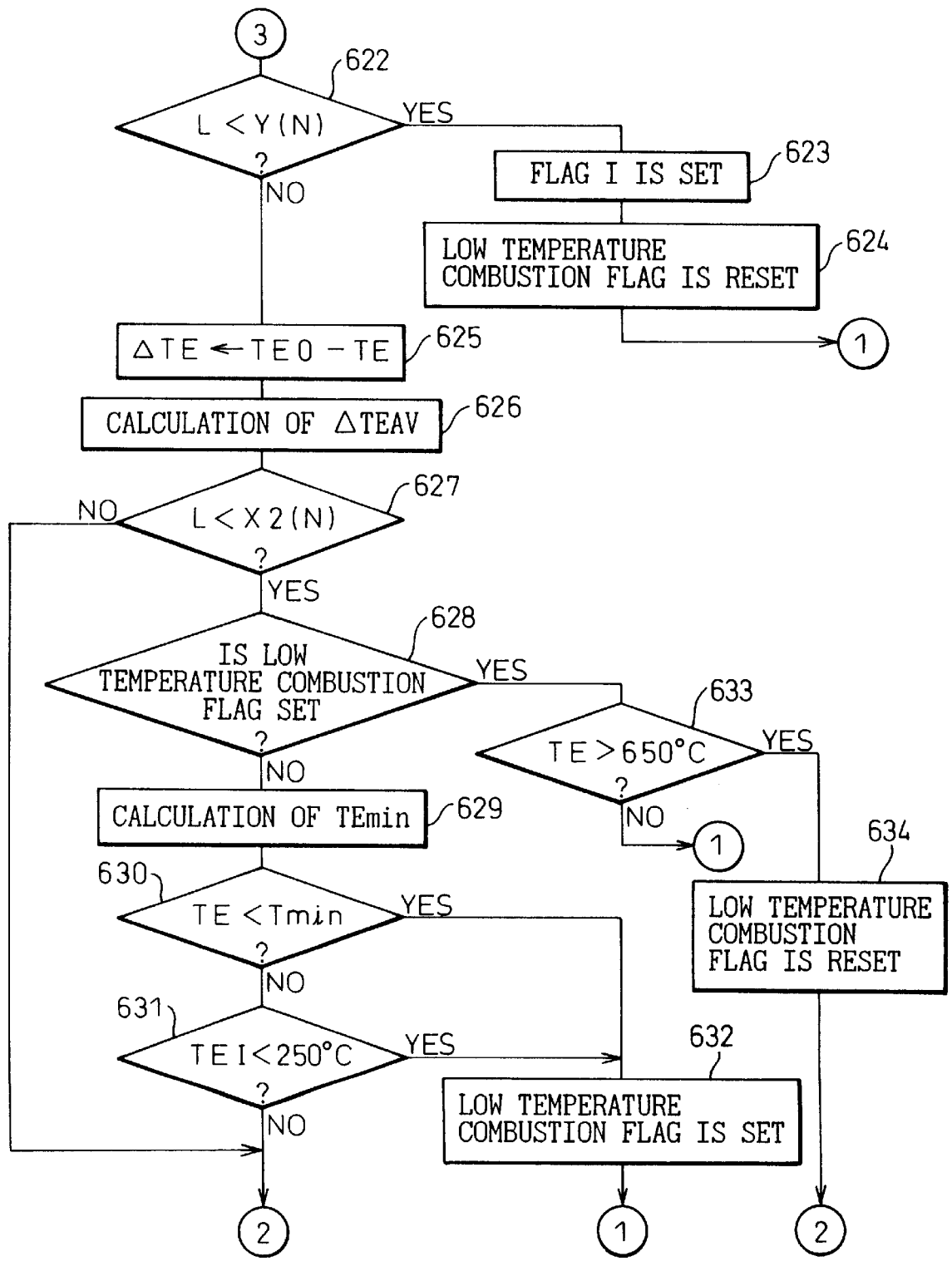
Figure 34:
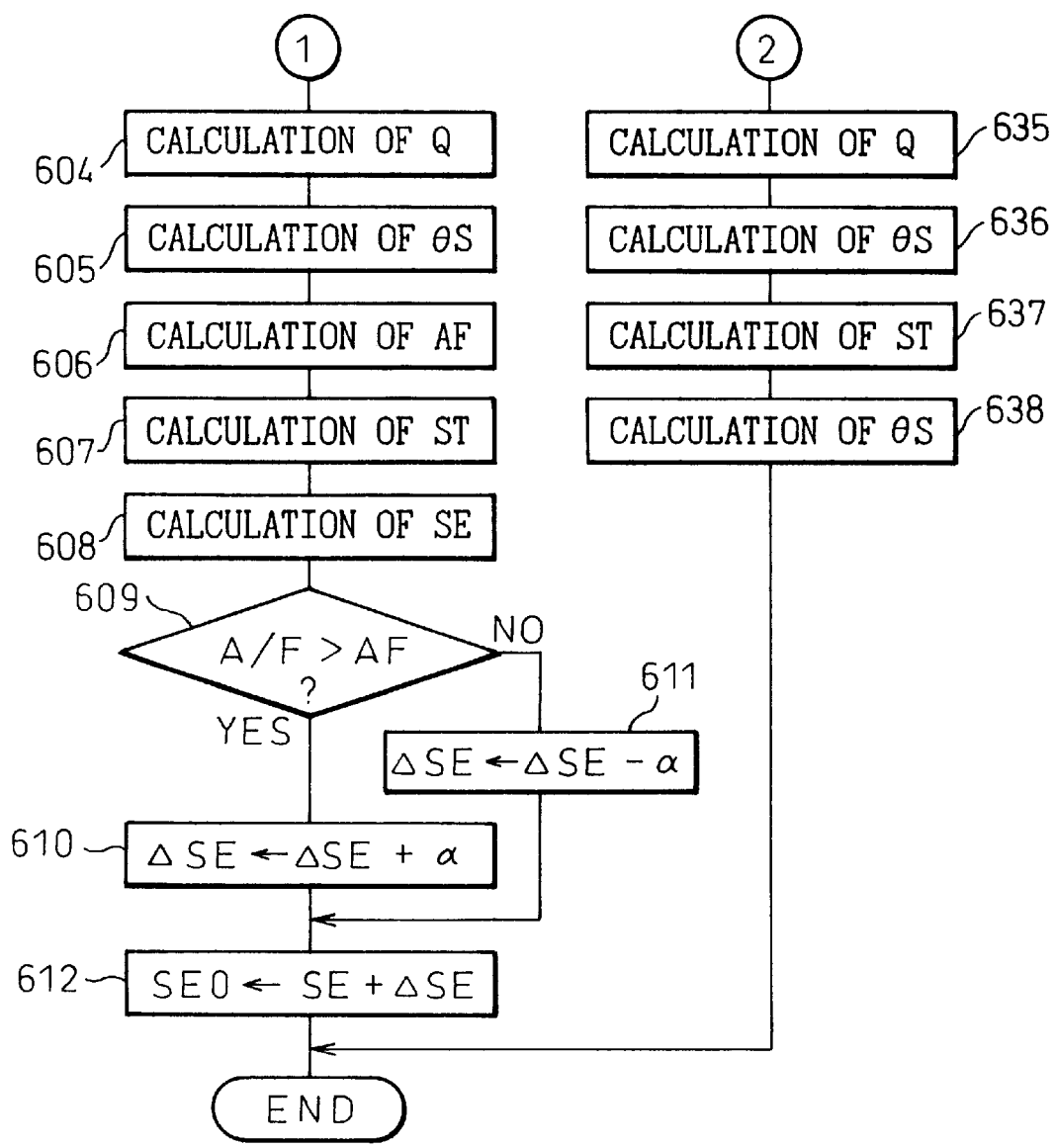

In the second embodiment, the routine for control of the operation shown from FIG. 32 to FIG. 34 is used instead of the routine for control of the operation shown in FIG. 26 and FIG. 27.

Referring to FIG. 32 to FIG. 34, first, at step 600, it is judged if the flag I showing that the engine is operating in the first operating region I has been set or not. When the flag I has been set, that is, when the engine is operating in the first operating region I, the routine proceeds to step 601, where it is judged if the required load L has become larger than the first boundary X1(N) or not. When $L \leq X1(N)$, the routine proceeds to step 602, where it is judged if the second combustion flag showing that the second combustion should be performed has been set or not. When the second combustion flag has not been set, the routine proceeds to step 603, where it is judged if the temperature TE of the exhaust gas downstream of the catalyst 19 detected by the temperature sensor 46 is higher than the maximum allowable temperature, for example, 650° C., or not. When $TE \leq 650°$ C., the routine proceeds to step 604, where low temperature combustion is performed.

That is, at step 604, the amount of injected fuel Q is calculated, then at step 605, the injection start timing OS is calculated. Next, at step 606, the target air-fuel ratio AF is calculated by proportional distribution using two maps in accordance with K(T) among the maps shown from FIGS. 15A to 15D. Next, at step 607, the target opening degree ST of the throttle valve 16 is calculated by proportional distribution using two maps in accordance with the target air-fuel ratio AF among the maps shown from FIGS. 16A to 16D. The opening degree of the throttle valve 16 is controlled to this target opening degree ST. Next, at step 608, the target basic opening degree SE of the EGR control valve 23 is calculated by proportional distribution using two maps in accordance with the target air-fuel ratio AF among the maps shown from FIGS. 17A to 17D. Next, the routine proceeds to step 609.

At step 609, it is judged if the actual air-fuel ratio A/F detected by the air-fuel ratio sensor 21 is larger than the target air-fuel ratio AF or not. When A/F>AF, the routine proceeds to step 610, where the predetermined value α is added to the correction value ASE for the opening degree of the EGR control valve 23, then the routine proceeds to step 612. As opposed to this, when A/F≦AF, the routine proceeds to step 611, where the predetermined value α is subtracted from the correction value ASE, then the routine proceeds to step 612. At step 612, the correction value ASE is added to the target basic opening degree SE of the EGR control valve 23 to calculate the target opening degree SE0 of the EGR control valve 23. The opening degree of the EGR control valve 23 is controlled to this target opening degree SE0. That is, in this embodiment, by controlling the opening degree of the EGR control valve 23, the actual air-fuel ratio is controlled to the target air-fuel ratio AF. Of course, in this case, it is also possible to control the actual air-fuel ratio to the target air-fuel ratio AF by controlling the opening degree of the throttle valve 16.

On the other hand, when it is judged at step 603 that TE>650° C., the routine proceeds to step 613, where the second combustion flag is set. Next, the routine proceeds to step 635, where the second combustion is performed. That is, at step 635, the amount of injected fuel Q is calculated, at step 636, the injection start timing OS is calculated, at step 637, the target opening degree ST of the throttle valve 16 is calculated from the map shown in FIG. 19A, then at step 638, the target opening degree SE of the EGR control valve 23 is calculated from the map shown in FIG. 19B.

When the second combustion flag has been set, at the next processing cycle, the routine proceeds from step 602 to step 614. At step 614, the temperature difference ΔTE(=TEO−TE) between the temperature TEO of the exhaust gas downstream of the catalyst 19 detected at the previous processing cycle based on the output signal of the temperature sensor 46 and the current temperature TE of the exhaust gas downstream of the catalyst 19 is calculated. Next, at step 615, the average rate of decline ΔTEAV of the temperature TE of the exhaust gas, which is the average of the latest temperature difference ATE in a predetermined time period, is calculated. Next, at step 616, the minimum allowable temperature Tmin is calculated from the average rate of decline ΔTEAV of the temperature TE of the exhaust gas based on the relationship shown in FIG. 22.

Next, at step 617, it is judged if the temperature TE of the exhaust gas downstream of the catalyst 19 has become lower than the minimum allowable temperature Tmin or not. When TE≧Tmin, the routine proceeds to step 618, where it is judged if temperature TE of the exhaust gas upstream of the catalyst 19 detected by the temperature sensor 45 is higher than a predetermined temperature, for example, 250° C. When TEI≧250° C., the routine proceeds to step 635, where the second combustion is performed.

On the other hand, when it is judged at step 617 that TE<Tmin or when it is judged at step 618 that TEI<250° C., the routine proceeds to step 619, where the second combustion flag is reset. Next, the routine proceeds to step 604, where low temperature combustion is switched to.

On the other hand, when it is judged at step 601 that L>X1(N), the routine proceeds to step 620, where the flag I is reset, then the routine proceeds to step 621, where the second combustion flag is reset. Next, the routine proceeds to step 635, where second combustion is switched to.

When the flag I is set, the routine proceeds from step 600 to step 622, where it is judged if L<Y(N) or not. When L≦Y(N), the routine proceeds to step 625, where the temperature difference ΔTE(=TEO−TE) between the temperature TEO of the exhaust gas downstream of the catalyst 19 detected at the previous processing cycle based on the output signal of the temperature sensor 46 and the current temperature TE of the exhaust gas downstream of the catalyst 19 is calculated. Next, at step 626, the average rate of decline ΔTEAV of the temperature TE of the exhaust gas, which is the average of the latest temperature difference ΔTE in a predetermined time period, is calculated. Next, at step 627, it is judged if L<X2(N), that is, if the engine is operating in the boundary region Z. When L≧X2(N), that is, when the engine is operating in the second operating region II, the routine jumps to step 635, where second combustion is performed.

As opposed to this, when L<X2(N), that is, when the engine is operating in the boundary region Z, the routine proceeds to step 628, where it is judged if the low temperature combustion flag showing that low temperature combustion should be performed has been set. When the low temperature combustion flag has been reset, the routine proceeds to step 629, where the minimum allowable temperature Tmin is calculated from the average rate of decline ΔTEAV of the temperature TE of the exhaust gas based on the relationship shown in FIG. 22.

Next, at step 630, it is judged if the temperature TE of the exhaust gas downstream of the catalyst 19 has become lower than the minimum allowable temperature Tmin or not. When TE≧Tmin, the routine proceeds to step 631, where it is judged if the temperature TEI of the exhaust gas upstream of the catalyst 19 detected by the temperature sensor 45 is higher than a predetermined temperature, for example, 250° C. When TEI≧250° C., the routine proceeds to step 635, where the second combustion is performed.

On the other hand, when it is judged at step 630 that TE<Tmin or when it is judged at step 631 that TEI<250° C., the routine proceeds to step 632, where the low temperature combustion flag is set. Next, the routine proceeds to step 604, where low temperature combustion is switched to. When the low temperature combustion flag is set, at the next processing cycle, it is judged at step 628 that the low temperature combustion flag has been set, so the routine proceeds to step 633, where it is judged if the temperature TE of the exhaust gas is higher than the maximum allowable temperature, for example, 650° C. or not. When TE≦650° C., the routine proceeds to step 604, where low temperature combustion is performed. As opposed to this, when TE>650° C., the routine proceeds to step 634, where the low temperature combustion flag is reset. Next, the routine proceeds to step 635, where the second combustion is switched to.

On the other hand, when it is judged at step 622 that L<Y(N), the routine proceeds to step 623, where the flag I is set, then at step 624, the low temperature combustion flag is reset. Next, the routine proceeds to step 604, where the low temperature combustion is switched to.

According to the present invention, as explained above, it is possible to raise the temperature of the burned gas in the combustion chamber by switching from the second combustion to first combustion when desiring to raise the temperature of the burned gas in the combustion chamber.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of recirculated exhaust gas supplied in a combustion chamber increases and in which a further increase of the amount of recirculated exhaust gas supplied in the combustion chamber results in a temperature of fuel and surrounding gas in the combustion chamber becoming lower than a temperature of production of soot and therefore almost no production of soot any longer, said engine comprising:

switching means for selectively switching between a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks and;

judging means for judging one of if the temperature of burned gas in the combustion chamber should be raised and if the amounts of unburned HC and CO exhausted from the combustion chamber should be increased, said switching means switching from said second combustion to said first combustion when it is judged by said judging means that one of the temperature of burned gas in the combustion chamber should be raised or the amounts of unburned HC and CO exhausted from the combustion chamber should be increased when the second combustion is being performed.

2. A compression ignition type engine as set forth in claim 1, wherein the exhaust gas recirculation rate in the first combustion state is at least about 55 percent.

3. A compression ignition type engine as set forth in claim 1, wherein the temperature of the fuel and the gas surrounding it at the time of combustion in the first combustion state is a temperature at which the amount of NOx in the exhaust gas becomes around 10 ppm or less.

4. A compression ignition type engine as set forth in claim 1, wherein a catalyst having an oxidation function is arranged in an exhaust passage of the engine and said judging means judges that the temperature of burned gas in the combustion chamber should be raised or the amounts of unburned HC and CO exhausted from the combustion chamber should be increased when it is necessary to raise the temperature of the burned gas in the combustion chamber or increase the amounts of unburned HC and CO exhausted from the combustion chamber for maintaining the catalyst in the active state.

5. A compression ignition type engine as set forth in claim 1, wherein a catalyst having an oxidation function is arranged in an exhaust passage of the engine and said judging means judges that the temperature of burned gas in the combustion chamber should be raised or the amounts of unburned HC and CO exhausted from the combustion chamber should be increased when it is necessary to raise the temperature of the burned gas in the combustion chamber and increase the amounts of unburned HC and CO exhausted from the combustion chamber for maintaining the catalyst in the active state.

6. A compression ignition type engine as set forth in claim 1, wherein the catalyst is at least one of an oxidation catalyst, three-way catalyst, and NOx absorbent.

7. A compression ignition type engine as set forth in claim 5, wherein in the first combustion state, unburnt hydrocarbons are exhausted from the combustion chamber not in the form of soot but in the form of a soot precursor and the unburned hydrocarbons exhausted from the combustion chamber are oxidized by said catalyst.

8. A compression ignition type engine as set forth in claim 5, wherein: detecting means is provided for detecting a representative temperature representing the temperature of the catalyst and said judging means judges that the temperature of burned gas in the combustion chamber should be raised or the amounts of unburned HC and CO exhausted from the combustion chamber should be increased based on said representative temperature.

9. A compression ignition type engine as set forth in claim 8, wherein said detecting means is comprised of a temperature sensor arranged in an engine exhaust passage downstream of said catalyst, said representative temperature is a temperature of the exhaust gas exhausted from said catalyst, and said judging means judges that the temperature of burned gas in the combustion chamber should be raised or the amounts of unburned HC and CO exhausted from the combustion chamber should be increased for maintaining the catalyst in the active state when the temperature of the exhaust gas falls to a predetermined temperature.

10. A compression ignition type engine as set forth in claim 9, wherein said predetermined temperature is higher the faster the rate of decline of the temperature of the exhaust gas.

11. A compression ignition type engine as set forth in claim 8, wherein said detecting means is comprised of a temperature sensor arranged in an engine exhaust passage upstream of said catalyst, said representative temperature is a temperature of the exhaust gas flowing into said catalyst, and said judging means judges that the temperature of burned gas in the combustion chamber should be raised or the amounts of unburned HC and CO exhausted from the combustion chamber should be increased for maintaining the catalyst in the active state when the temperature of the exhaust gas falls to a predetermined temperature.

12. A compression ignition type engine as set forth in claim 11, wherein said predetermined temperature is a constant temperature.

13. A compression ignition type engine as set forth in claim 1, wherein said first combustion is switched to temporarily when it is judged that the temperature of burned gas in the combustion chamber should be raised or the amounts of unburned HC and CO exhausted from the combustion chamber should be increased when second combustion is being performed.

14. A compression ignition type engine as set forth in claim 1, wherein the air-fuel ratio is temporarily made rich, then the second combustion is switched to when switching from said first combustion to said second combustion.

15. A compression ignition type engine as set forth in claim 1, wherein an engine operating region is divided into a low load side first operating region where first combustion is performed, a high load side second operating region where second combustion is performed, and a boundary region between the first operating region and the second operating region where the first combustion and the second combustion are selectively performed and in said boundary region, second combustion is performed normally and first combustion is switched to when it is judged that the temperature of burned gas in the combustion chamber should be raised or the amounts of unburned HC and CO exhausted from the combustion chamber should be increased when second combustion is performed in said boundary region.

16. A compression ignition type engine as set forth in claim 1, wherein said judging means judges one of if the temperature of burned gas in the combustion chamber should be raised and if the amounts of unburned HC and CO exhausted from the combustion chamber should be increased and judges one of if the temperature of the burned gas in the combustion chamber should be lowered and if the amounts of unburned HC and CO exhausted from the combustion chamber should be reduced, said switching means switches from said second combustion to said first combustion when it is judged by said judging means that the temperature of burned gas in the combustion chamber should be raised or the amounts of unburned HC and CO exhausted from the combustion chamber should be increased when the second combustion is being performed, and said switching means switches from said first combustion to said second combustion when it is judged by said judging means that the temperature of burned gas in the combustion chamber should be lowered or the amounts of unburned HC and CO exhausted from the combustion chamber should be reduced when the first combustion is being performed.

17. A compression ignition type engine as set forth in claim 16, wherein a catalyst having an oxidation function is arranged in the engine exhaust passage, detecting means is provided for detecting a representative temperature representing the temperature of said catalyst, first combustion is switched to for raising the temperature of burned gas in the combustion chamber or increasing the amounts of unburned HC and CO exhausted from the combustion chamber when said representative temperature falls to a predetermined minimum allowable temperature when the second combustion is being performed, and second combustion is switched to for lowering the temperature of burned gas in the combustion chamber or reducing the amounts of unburned HC and CO exhausted from the combustion chamber when said representative temperature rises to a predetermined maximum allowable temperature when the first combustion is being performed.

18. A compression ignition type engine as set forth in claim 17, wherein said minimum allowable temperature is a temperature necessary for maintaining the catalyst in an active state and said maximum allowable temperature is a temperature necessary for suppressing deterioration of the catalyst.

19. A compression ignition type engine as set forth in claim 1, wherein a catalyst having an oxidation function is arranged in the engine exhaust passage, calculating means is provided for calculating a cumulative value representing an amount of adsorption of SOx in said catalyst, and first combustion is performed at a rich air-fuel ratio when said cumulative value exceeds a predetermined value and the temperature of the catalyst exceeds a temperature at which the SOx adsorbed in the catalyst disassociates.

20. A compression ignition type engine as set forth in claim 19, wherein said cumulative value is a cumulative value of one of an engine operating time, distance of travel of a vehicle, and amount of supply of fuel.

* * * * *